(12) United States Patent
Akinyemi et al.

(10) Patent No.: US 8,411,950 B2
(45) Date of Patent: Apr. 2, 2013

(54) IMAGE SEGMENTATION

(75) Inventors: Akinola Akinyemi, Edinburgh (GB); Ian Poole, Edinburgh (GB); Costas Plakas, Edinburgh (GB); Jim Piper, Edinburgh (GB)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 13/407,867

(22) Filed: Feb. 29, 2012

(65) Prior Publication Data

US 2012/0177263 A1 Jul. 12, 2012

Related U.S. Application Data

(62) Division of application No. 12/847,372, filed on Jul. 30, 2010, now Pat. No. 8,160,357.

(51) Int. Cl.
G06K 9/34 (2006.01)

(52) U.S. Cl. ......... 382/173; 382/180; 128/922; 600/407

(58) Field of Classification Search .................. 382/173, 382/180; 128/922–925; 600/407–480
See application file for complete search history.

(56) References Cited

PUBLICATIONS

Fedde van der Lijn et al, Hippocampus segmentation in MR images using atlas registration, voxel classification, and graph cuts, NeuroImage 2008.*

Meritxell Bach Cuadra et al, Atlas-Based Segmentation of Pathological MR Brain Images Using a Model of Lesion Growth, IEEE 2004.*
M. Lorenzo-Valdes et al, Atlas-Based Segmentation and Tracking of 3D Cardiac MR Images Using Non-rigid Registration, Springer 2002.*
U.S. Appl. No. 12/999,866.*
P. Aljabar, et al., "Multi-atlas based segmentation of brain images: Atlas selection and its effect on accuracy", NeuroImage, vol. 46, 2009, pp. 726-738.
Olivier Commowick, et al., "Efficient Selection of the Most Similar Image in a Database for Critical Structures Segmentation", Proc. Medical Image Computing and Computer Assisted Intervention (MICCAI'07), Part II, No. 4792, Oct. 2007, 8 pages.
Torsten Rohlfing, et al., "Evaluation of atlas selection strategies for atlas-based image segmentation with application to confocal microscopy images of bee brains", NeuroImage, vol. 21, No. 4, Apr. 2004, pp. 1428-1442.

(Continued)

*Primary Examiner* — Chan S Park
*Assistant Examiner* — Mark Roz
(74) *Attorney, Agent, or Firm* — Oblon, Spivak, McClelland, Maier & Neustadt, L.L.P.

(57) ABSTRACT

According to one embodiment there is provided a method of selecting a plurality of M atlases from among a larger group of N candidate atlases to form a multi-atlas data set to be used for computer automated segmentation of novel image data sets to mark objects of interest therein. A set of candidate atlases is used containing a reference image data set and segmentation data. Each of the candidate atlases is segmented against the others in a leave-one-out strategy, in which the candidate atlases are used as training data for each other. For each candidate atlas in turn, the following is carried out: registering; segmenting; computing an overlap; computing a value of the similarity measure for each of the registrations; and obtaining a set of regression parameters by performing a regression with the similarity measure being the independent variable and the overlap being the dependent variable.

5 Claims, 18 Drawing Sheets

PUBLICATIONS

Torsten Rohlfing, et al., "Quo vadis, Atlas-Based Segmentation?", The Handbook of Medical Image Analysis, vol. III, Registration Models, chapter 11, Aug. 2005, 57 pages.

Torsten Rohlfing, et al., "Performance-Based Classifier Combination in Atlas-Based Image Segmentation Using Expectation-Maximization Parameter Estimation", IEEE Transactions on Medical Imaging, vol. 23, No. 8, Aug. 2004, pp. 983-994.

Simon K. Warfield, et al., Simultaneous Truth and Performance Level Estimation (STAPLE): An Algorithm for the Validation of Image Segmentation, IEEE Transactions on Medical Imaging, vol. 23, No. 7, Jul. 2004, pp. 903-921.

Minjie Wu, et al., "Optimum template selection for atlas-based segmentation", NeuroImage, vol. 34, 2007, pp. 1612-1618.

Jyrki MP. Lötjönen, et al., "Fast and robust multi-atlas segmentation of brain magnetic resonance images", NeuroImage, vol. 34, 2009, 14 pages.

* cited by examiner

|    | | 1798_006 | 1803_025 | 1805_003 | 1831_004 | 1686_001 | 1688_001 | 1700_011 | 1701_014 |
|----|---|----------|----------|----------|----------|----------|----------|----------|----------|
| CC | 01798_006 | 0.928 | 0.855 | 0.911 | 0.794 | 0.878 | 0.911 | 0.807 | 0.814 |
|    | 01803_025 | 0.822 | 0.92  | 0.901 | 0.85  | 0.846 | 0.874 | 0.846 | 0.744 |
|    | 01805_003 | 0.838 | 0.795 | 0.927 | 0.804 | 0.842 | 0.854 | 0.805 | 0.739 |
|    | 01831_004 | 0.882 | 0.829 | 0.907 | 0.934 | 0.879 | 0.869 | 0.857 | 0.778 |
|    | 01686_001 | 0.816 | 0.754 | 0.855 | 0.828 | 0.918 | 0.817 | 0.833 | 0.77  |
|    | 01688_001 | 0.863 | 0.786 | 0.854 | 0.8   | 0.821 | 0.917 | 0.782 | 0.696 |
|    | 01700_011 | 0.872 | 0.836 | 0.901 | 0.879 | 0.89  | 0.871 | 0.905 | 0.803 |
|    | 01701_014 | 0.848 | 0.823 | 0.882 | 0.856 | 0.86  | 0.856 | 0.84  | 0.853 |

*Fig.12A*

|    | | 1798_006 | 1803_025 | 1805_003 | 1831_004 | 1686_001 | 1688_001 | 1700_011 | 1701_014 |
|----|---|----------|----------|----------|----------|----------|----------|----------|----------|
| MI | 01798_006 | 2.66 | 1.25 | 1.13 | 1    | 1     | 1.21 | 1.08  | 1.12 |
|    | 01803_025 | 1.14 | 2.93 | 1.3  | 1.21 | 0.898 | 1.15 | 0.916 | 1.21 |
|    | 01805_003 | 1.18 | 1.4  | 2.93 | 1.16 | 0.949 | 1.21 | 1.06  | 1.18 |
|    | 01831_004 | 1.06 | 1.27 | 1.21 | 2.85 | 1.02  | 1.1  | 0.856 | 1.14 |
|    | 01686_001 | 1.04 | 1.06 | 1.05 | 1.12 | 2.83  | 1.11 | 1.1   | 1.12 |
|    | 01688_001 | 1.18 | 1.24 | 1.15 | 1.11 | 1.07  | 2.84 | 1.05  | 1.12 |
|    | 01700_011 | 1.05 | 1    | 1.04 | 1.04 | 1.07  | 1.08 | 2.72  | 1.17 |
|    | 01701_014 | 1.09 | 1.26 | 1.08 | 1.25 | 1.1   | 1.17 | 1.14  | 2.76 |

*Fig.12B*

|   | | 1798_006 | 1803_025 | 1805_003 | 1831_004 | 1686_001 | 1688_001 | 1700_011 | 1701_014 |
|---|---|----------|----------|----------|----------|----------|----------|----------|----------|
| J | 01798_006 | 0.966 | 0.887 | 0.915 | 0.86  | 0.914 | 0.903 | 0.889 | 0.889 |
|   | 01803_025 | 0.864 | 0.951 | 0.875 | 0.887 | 0.833 | 0.844 | 0.847 | 0.839 |
|   | 01805_003 | 0.901 | 0.889 | 0.959 | 0.925 | 0.859 | 0.867 | 0.854 | 0.863 |
|   | 01831_004 | 0.863 | 0.905 | 0.929 | 0.954 | 0.885 | 0.885 | 0.87  | 0.86  |
|   | 01686_001 | 0.898 | 0.846 | 0.899 | 0.913 | 0.956 | 0.878 | 0.864 | 0.837 |
|   | 01688_001 | 0.934 | 0.9   | 0.937 | 0.933 | 0.922 | 0.961 | 0.91  | 0.902 |
|   | 01700_011 | 0.885 | 0.885 | 0.891 | 0.914 | 0.882 | 0.883 | 0.954 | 0.892 |
|   | 01701_014 | 0.938 | 0.935 | 0.942 | 0.952 | 0.925 | 0.924 | 0.926 | 0.962 |

*Fig.12C*

IMAGE SEGMENTATION

CROSS-REFERENCE TO RELATED APPLICATION

This application is a divisional of U.S. application Ser. No. 12/847,372, filed Jul. 30, 2010.

BACKGROUND OF THE INVENTION

Embodiments described herein relate generally to segmentation of images, such as three-dimensional (3D) medical images.

The method by which objects represented in images are labeled is referred to as segmentation.

Objects may be manually labeled by an expert, and this is considered to be 'the gold standard' in view of the sophistication of an expert in recognizing objects, such as a clinician identifying organs and their sub-structure in two-dimensional (2D) or 3D X-ray images.

Automated image processing procedures carried out by computers are widely available to perform segmentation in a host of different applications.

FIG. 1 is a flow chart showing a basic segmentation process.

In Step S1, a novel image data set, referred to in the figure as a patient image data set, is provided to a computer for segmentation.

In Step S2, a registration is carried out to align the novel image data set with a reference image data set which has already been segmented and is stored with its segmentation data. The reference image data set with its segmentation data is referred to as an atlas data set, or simply an atlas. The atlas carries the segmentation data in a set of masks which indicate labeled features, such as one or more anatomical features that have been labeled manually. This alignment step is referred to in the prior art as registration. For example, in the case of a 3D medical image, the atlas has its anatomical regions of interest labeled, so that all voxels belonging to a particular anatomical region are marked with a common label. Typically registration is done with a series of transformations including rigid and non-rigid transformations, and at least one warp transformation.

In Step S3, the registered novel image data set is segmented. Segmentation is the process by which the atlas labels are propagated, or applied, to the novel image data set.

In Step S4, the segmented novel image data set, i.e. the novel image data set and the associated segmentation data, is output. In the case of 3D medical image data, the novel image data set will be loaded into and displayed by a volume rendering program, which will exploit the segmentation data to allow selective configuration of display parameters based on the segmentation data.

Volume rendering is a visualization method for viewing two-dimensional (2D) representations of three-dimensional (3D) data sets and is widely used in medical imaging. Multiplanar reformatting (MPR) is a type of volume rendering often used for processing 3D data sets collected by medical imaging equipment.

In the field of 3D medical imaging, rather than using only one atlas to segment every novel image data set, it has become well known to use multiple atlases in the segmentation process.

Multi-atlas segmentation proceeds by making some kind of intelligent selection or weighting between or among multiple atlases to produce the best results for the particular novel image data set being processed, or at least a better result on average than if only a single atlas was used. Intuitively, the value of multi-atlas segmentation in medical imaging can be appreciated, given that any sample human or animal population will not be a continuum, but rather split into defined groups: for example based on age, environment, pathology or ethnicity.

Anatomical variation in the thoracic cavity is a good example of general differences that exist among patients. Cardio-thoracic ratio (CTR) is a measure of the diameter of the heart with respect to the diameter of the thoracic cavity defined for chest X-ray images. CTR has been found to be a good indicator of heart pathology. It has also been shown, that CTR not only varies based on pathology, but also varies with age, body size and ethnicity.

In multi-atlas segmentation applications, the choice of atlas or atlases to perform segmentation on is very important. The overall goal of an organ atlas is to be as typical as possible to an anatomical category, and this poses a challenge to medical image analysis because of underlying variability in anatomy.

FIG. 2 is a flow chart showing the steps of an example multi-atlas segmentation process based on M atlases, where M is a positive integer of 2 or more, typically 2, 3, 4 or 5.

In Step S1, a novel image data set is provided to a computer for segmentation.

In Step S2M, each of the M atlases is aligned with the novel image data set. As illustrated, this is essentially a parallel process, since each of the registrations is independent of the others.

In Step S3M, values of a common similarity measure is computed for each pair of registered images.

In Step S4, the similarity values are compared and based on these values one of the atlases is chosen to be the one to use for segmenting the novel image data set. There are known variations in this general method, such as not choosing a single atlas, but choosing multiple atlases, and consolidating the results using some kind of weighting or voting scheme to determine the labeling of voxels (or pixels). Perhaps the most common similarity measures used are mutual information (MI), normalized mutual information (NMI) and cross-correlation (CC).

In Step S5, the registered novel image data set is segmented using the selected atlas.

In Step S6, the segmented novel image data set, i.e. the novel image data set and the associated segmentation data, is output.

BRIEF DESCRIPTION OF THE DRAWINGS

The invention is now described by way of example only with reference to the following drawings.

FIG. 12A is a table showing the cross-correlation (CC) values between the image data sets of the sample population.

FIG. 12B is the corresponding table to FIG. 12A but for mutual information (MI).

FIG. 12C is the corresponding table to FIG. 12A but for Jaccard overlap (J).

DETAILED DESCRIPTION

Figure 3:
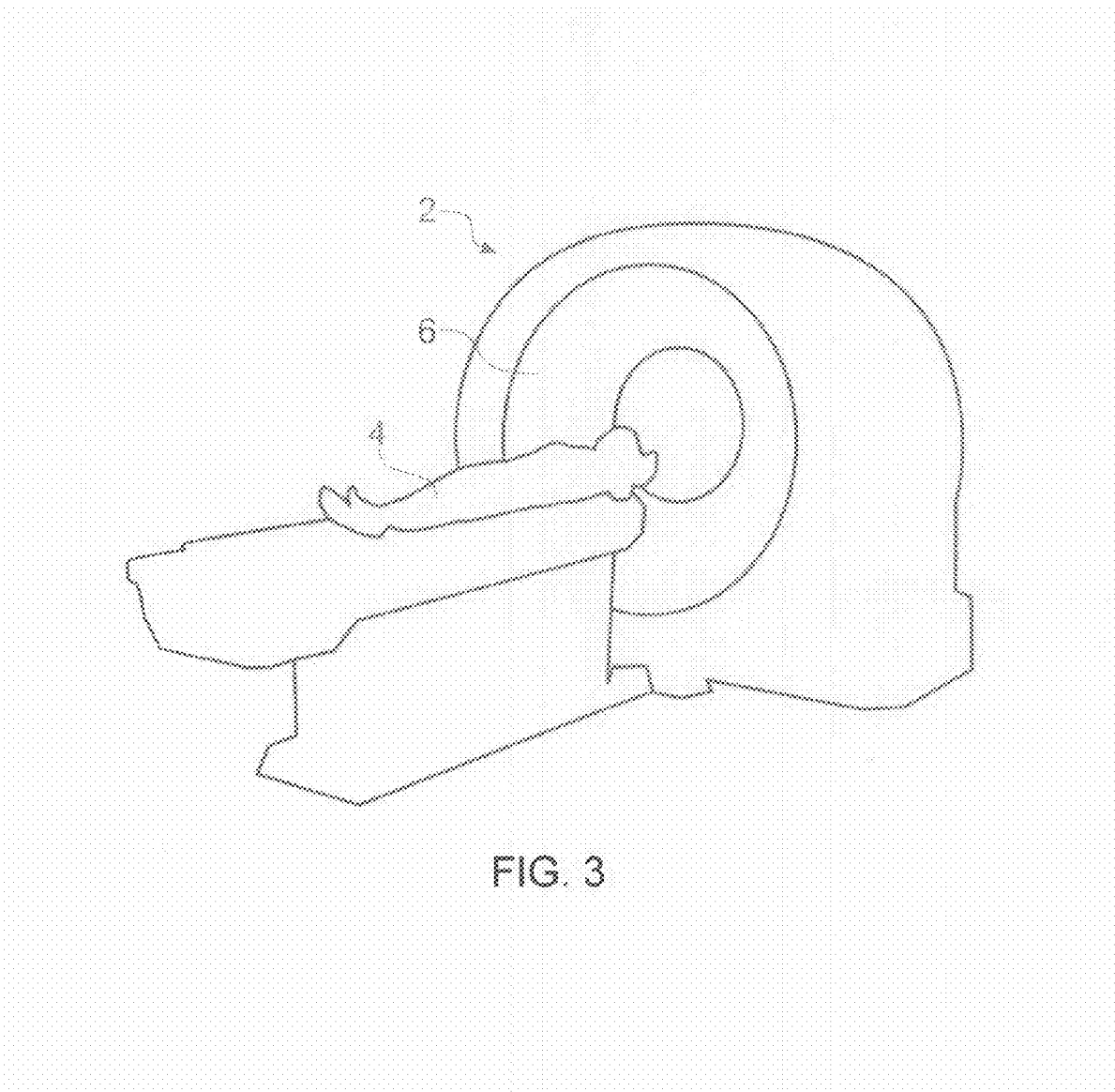
FIG. 3 shows a generic magnetic resonance scanner for generating volume data.

FIG. 3 is a schematic perspective view of a generic scanner 2, most especially a CT scanner, for obtaining a 3D X-ray scan of a region of a patient 4. An anatomical feature of interest is placed within a circular opening 6 of the scanner 2 and a series of image slices through the patient is taken. Raw image data are derived from the scanner and could comprise a collection of one thousand 2D 512×512 data subsets, for example. These data subsets, each representing a slice of the region of the patient being studied, are combined to produce volume data. The volume data comprise a collection of voxels each of which corresponds to a pixel in one of the slices. Thus the volume data are a 3D representation of the feature imaged and various user-selected 2D projections (output images) of the 3D representation can be displayed (typically on a computer monitor).

Different imaging modalities (e.g. CT, MR, PET, ultrasound) typically provide different image resolutions (i.e. voxel size), and the overall size of the volume imaged will further depend on the nature of the study. However, in the following description, by way of concrete example it will be assumed that the volume data comprise an array of 512×512× 1024 16-bit voxels arranged on a regular Cartesian grid defined by x-, y- and z-axes, with the voxels being spaced by 0.5 mm along each axis. This corresponds to an overall imaged volume of around 25 cm×25 cm×50 cm, which is more than adequate to encompass the human heart and adjacent regions. As is conventional, the volume data are aligned with transverse, sagittal and coronal planes for diagnosis of each organ, etc. For example, the xy-axes are in a transverse plane, the xz-axes are in a coronal plane and the yz-axes are in a sagittal plane.

Figure 4:
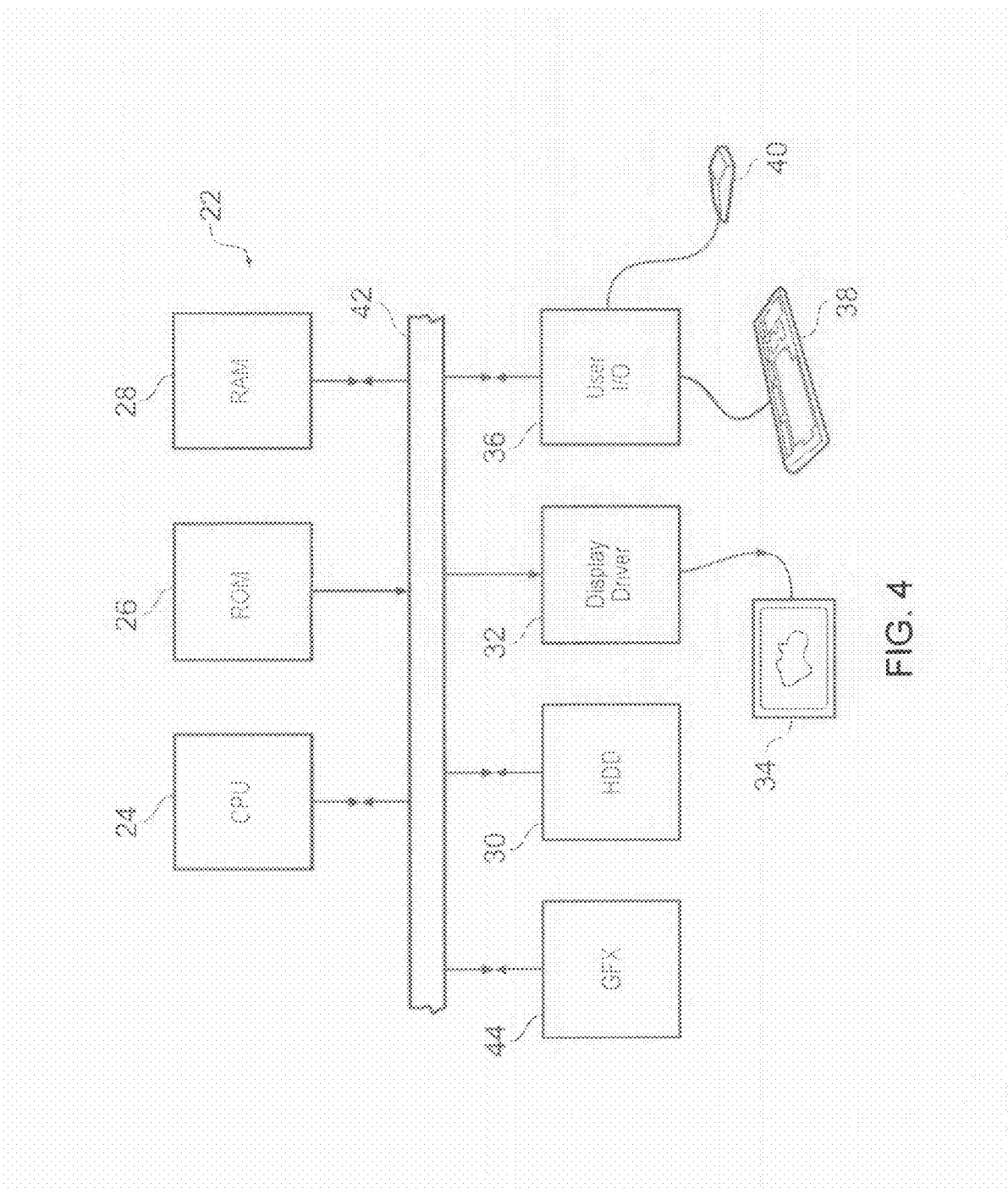
FIG. 4 schematically shows a computer for processing image data.

FIG. 4 schematically illustrates a general purpose computer system 22 configured to perform processing of volume data to generate two dimensional images. The computer 22 includes a central processing unit (CPU) 24, a read only memory (ROM) 26, a random access memory (RAM) 28, a hard disk drive 30, a display driver 32 and display 34 and a user input/output (IO) circuit 36 with a keyboard 38 and mouse 40. These devices are connected via a common bus 42. The computer 22 also includes a graphics card 44 connected via the common bus 42. In this example, the graphics card is a Radeon X800XT visual processing unit manufactured by ATI Technologies Inc., Ontario Canada. The graphics card includes a graphics processing unit (GPU) and random access memory tightly coupled to the GPU (GPU memory) (not shown in FIG. 4).

The CPU 24 may execute program instructions stored within the ROM 26, the RAM 28 or the hard disk drive 30 to carry out processing of signal values associated with voxels of volume data that may be stored within the RAM 28 or the hard disk drive 30. The RAM 28 and hard disk drive 30 are collectively referred to as the system memory. The GPU may also execute program instructions to carry out processing of volume data passed to it from the CPU.

Figure 5:
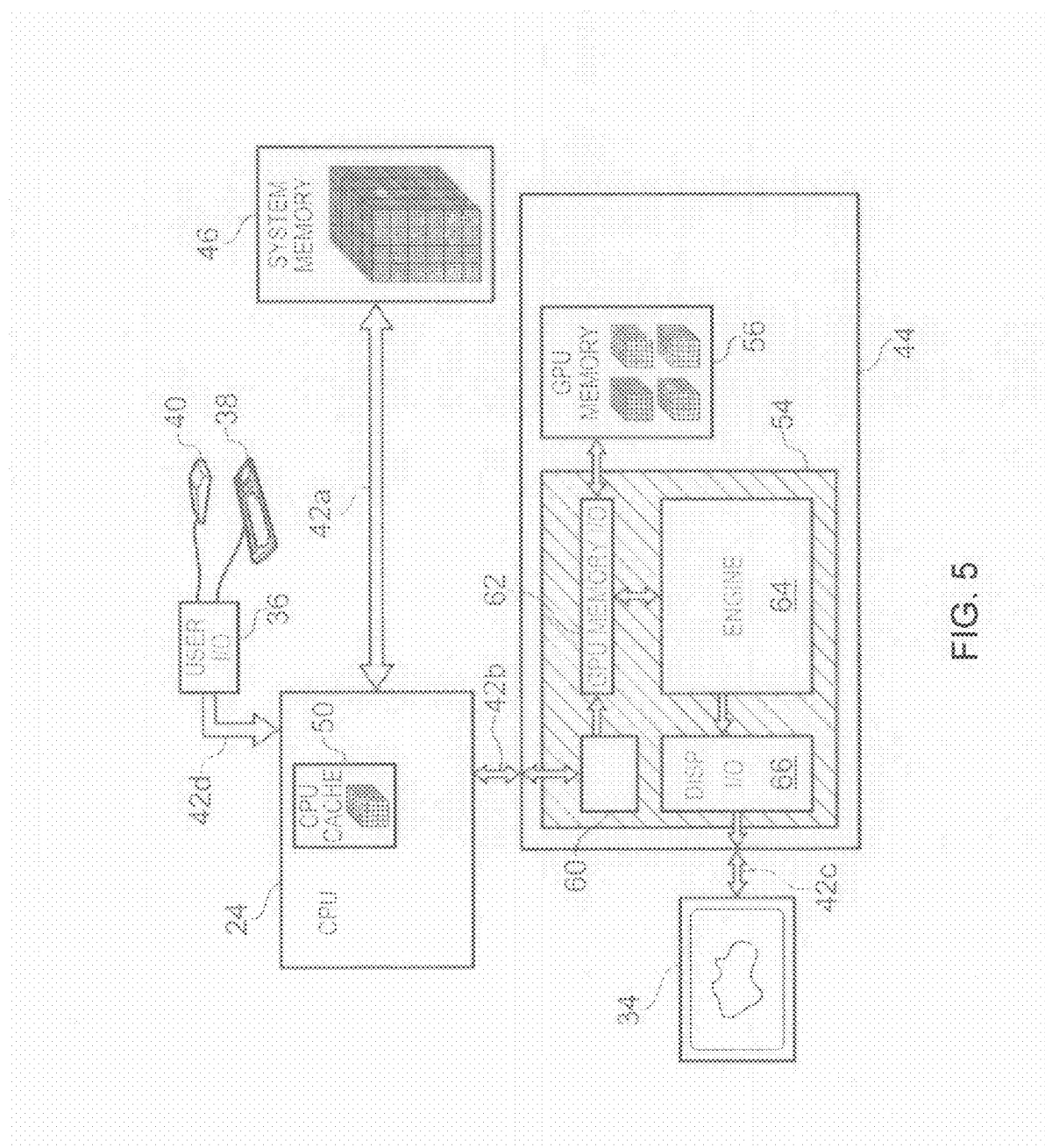
FIG. 5 schematically shows some of the features of the computer of FIG. 4 in more detail.

FIG. 5 schematically shows some of the features of the computer system shown in FIG. 4 in more detail. The RAM 28 and hard disk drive 30 are shown collectively as a system memory 46. Volume data 48 obtained from the scanner 2 shown in FIG. 3 is stored in the system memory as shown schematically in the figure.

To assist in showing the different data transfer routes between features of the computer system 22, the common bus 42 shown in FIG. 4 is schematically shown in FIG. 5 as a series of separate bus connections 42a-d. A first bus connection 42a connects between the system memory 46 and the CPU 24. A second bus connection 42b connects between the CPU 24 and the graphics card 44. A third bus connection 42c connects between the graphics card 44 and the display 34. A fourth bus connection 42d connects between the user I/O 36 and the CPU 24. The CPU includes a CPU cache 50. The graphics card 44 includes a GPU 54 and a GPU memory 56. The GPU 54 includes circuitry for providing an accelerated graphics processing interface 60, a GPU cache I/O controller 62, a processing engine 64 and a display I/O controller 66. The processing engine 64 is designed for optimized execution of the types of program instructions typically associated with processing 3D image data sets and carrying out 3D rendering of such data sets.

The user defines the required parameters using the keyboard 38 and mouse 40 in combination with a menu of options displayed on the display 34, for example using conventional techniques.

The example implementations of the invention described below relate to cardiac CT(A) data, i.e. 3D X-ray image data of the heart. To provide contrast for the X-rays, the blood is typically dyed with an agent having higher stopping power than the surrounding tissue. Iodine is a common staining agent used for this purpose. The following description presupposes that a 4D CT cardiac data set has been collected from a patient using a suitable CT scanner, and is stored in system memory.

Methods described herein can be used within a hospital environment. In this case, the methods may be practiced in cooperation with a software application that operates on a stand-alone computer device, or with an application on a server, such as a Picture Archiving and Communication System (PACS). A PACS is a hospital-based computerized network which can store volume data representing diagnostic images of different types in a digital format organized in a single central archive. For example, images may be stored in the Digital Imaging and Communications in Medicine (DICOM) format. Each image has associated patient information such as the name and date of birth of the patient also stored in the archive. The archive is connected to a computer network provided with a number of workstations, so that users all around the hospital site can access and process patient data as needed. Additionally, users remote from the site may be permitted to access the archive over the Internet.

In the context of the present invention, therefore, a plurality of image volume data sets can be stored in a PACS archive, and a computer-implemented method of generating movies or other output images of a chosen one of the volume data sets according to embodiments of the invention can be provided on a workstation connected to the archive via a computer network. A user such as a radiologist, a consultant, or a researcher can thereby access any volume data set from the workstation, and generate and display movies or other images, such as a stills image of a heart feature at a particular phase of interest, using methods embodying the invention.

Figure 6:
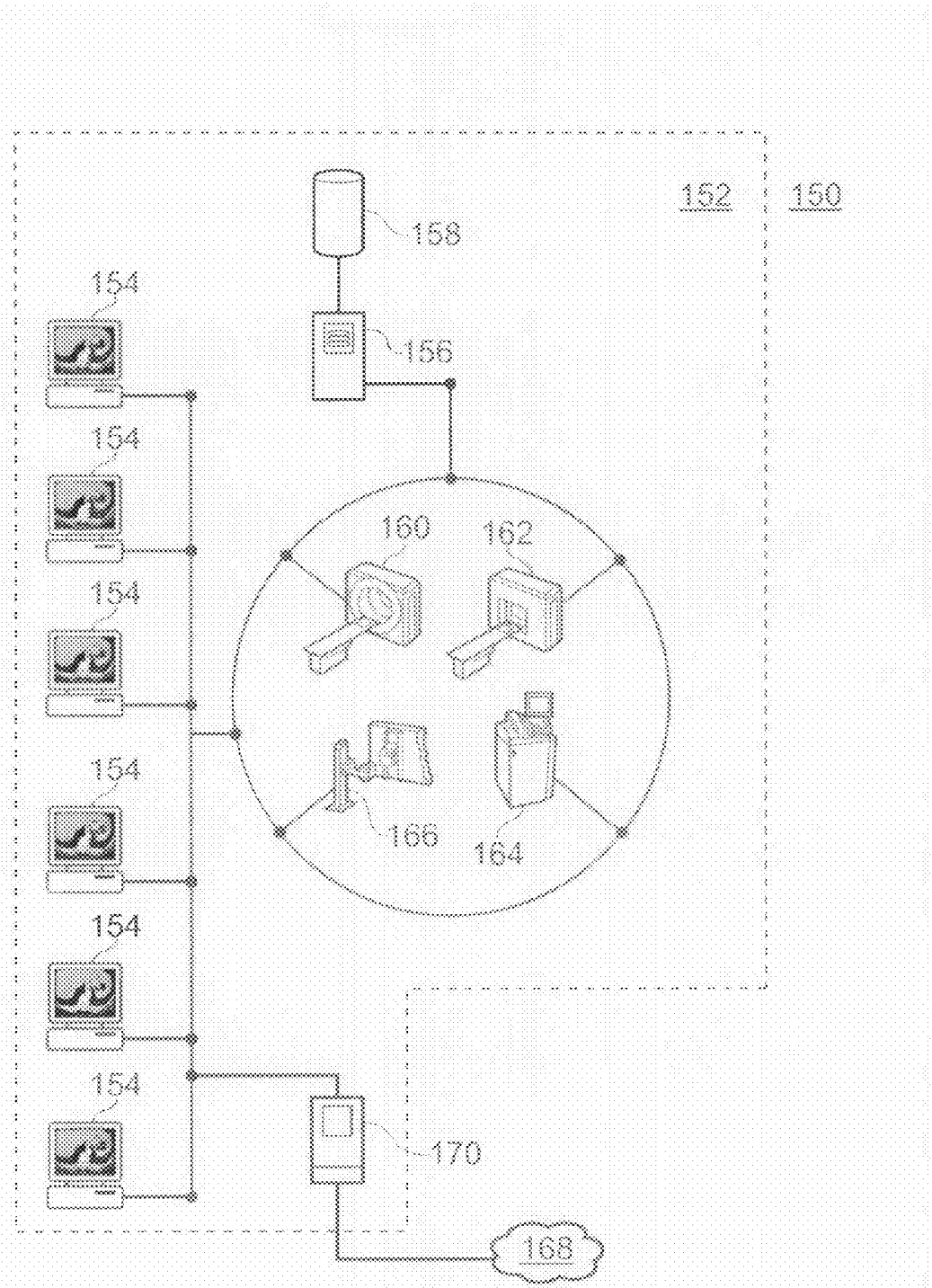
FIG. 6 shows an example computer network.

FIG. 6 shows an example computer network. The network 150 comprises a local area network in a hospital 152. The hospital 152 is equipped with a number of workstations 154 which each have access, via the local area network, to a hospital computer server 156 having an associated storage device 158. A PACS archive is stored on the storage device 158 so that data in the archive can be accessed from any of the workstations 154. One or more of the workstations 154 has access to a graphics card and to software for computer-implementation of methods described herein. The software may be stored locally at the or each workstation 154, or may be stored remotely and downloaded over the network 150 to a workstation 154 when needed. In other example, methods described herein may be executed on the computer server with the workstations 154 operating as terminals. For example, the workstations may be configured to receive user input defining a desired image data set and to display resulting images while volume rendering is performed elsewhere in the system. Also, a number of medical imaging devices 160, 162, 164, 166 are connected to the hospital computer server 156.

Image data collected with the devices 160, 162, 164, 166 can be stored directly into the PACS archive on the storage device 156. Thus patient images can be rendered and viewed immediately after the corresponding volume data are recorded, so that a swift diagnosis can be obtained in the event of medical emergency. The local area network is connected to the Internet 168 by a hospital Internet server 170, which allows remote access to the PACS archive. This is of use for remote accessing of the data and for transferring data between hospitals, for example, if a patient is moved, or to allow external research to be undertaken.

In the described embodiments, a computer implementation employing computer program code for storage on a data carrier or in memory can be used to control the operation of the CPU and GPU of the computer system. The computer program can be supplied on a suitable carrier medium, for example a storage medium such as solid state memory, magnetic, optical or magneto-optical disk or tape based media. Alternatively, it can be supplied on a transmission medium, for example a medium with a carrier such as a telephone, radio or optical channel.

A method is now described for selecting a plurality of M atlases from among a larger group of N candidate atlases to form a multi-atlas data set to be used for computer automated segmentation of novel image data sets to mark objects of interest therein.

Namely, a first aspect relates to a method of selecting a plurality of M atlases from among a larger group of N candidate atlases to form a multi-atlas data set to be used for computer automated segmentation of novel image data sets to mark objects of interest therein, the method comprising: (a) providing a set of candidate atlases, each candidate atlas containing a reference image data set and segmentation data which marks an object of interest within the reference image data set; (b) providing a plurality of training image data sets, each containing a training image data set and segmentation data which marks an object of interest within the training image data set; (c) segmenting each of the training image data sets against each of the candidate atlases such that for each candidate atlas in turn the following is carried out: (i) registering the candidate atlas with each of the training image data sets; (ii) segmenting each of the training image data sets with the candidate atlas; (iii) computing an overlap between each training image data set and the candidate atlas; (iv) computing a value of the similarity measure for each of the registrations; (v) obtaining a set of regression parameters by performing a regression with the similarity measure being the independent variable and the overlap being the dependent variable; (d) selecting a subset of M atlases from among all the N candidate atlases to form the multi-atlas data set, the M atlases being those atlases determined to collectively provide the highest aggregate overlap over all the training data image sets.

The multi-atlas data set may then be output to a computer program operable to segment novel image data sets or stored on a computer program product on which the computer program is stored.

The reference image data sets and the training image data sets may be one and the same image data sets, with the method being carried out using a leave-one-out strategy.

A computer program product bearing machine readable instructions for carrying out the above method is also disclosed.

A computer loaded with and operable to execute machine readable instructions for carrying out the method is also disclosed.

The method described below with reference to FIGS. 7 to 11 assumes that the training data set is separate from the candidate atlases. This is for ease of explanation of the principles. However, in practice, it is preferable to use a leave-one-out strategy in which each candidate atlas is tested against all other candidate atlases, i.e. when testing any given candidate atlases, the other atlases are used as training data sets. Indeed, in the example described with reference to FIGS. 12 to 15, a leave-one-out strategy is used.

Figure 10:
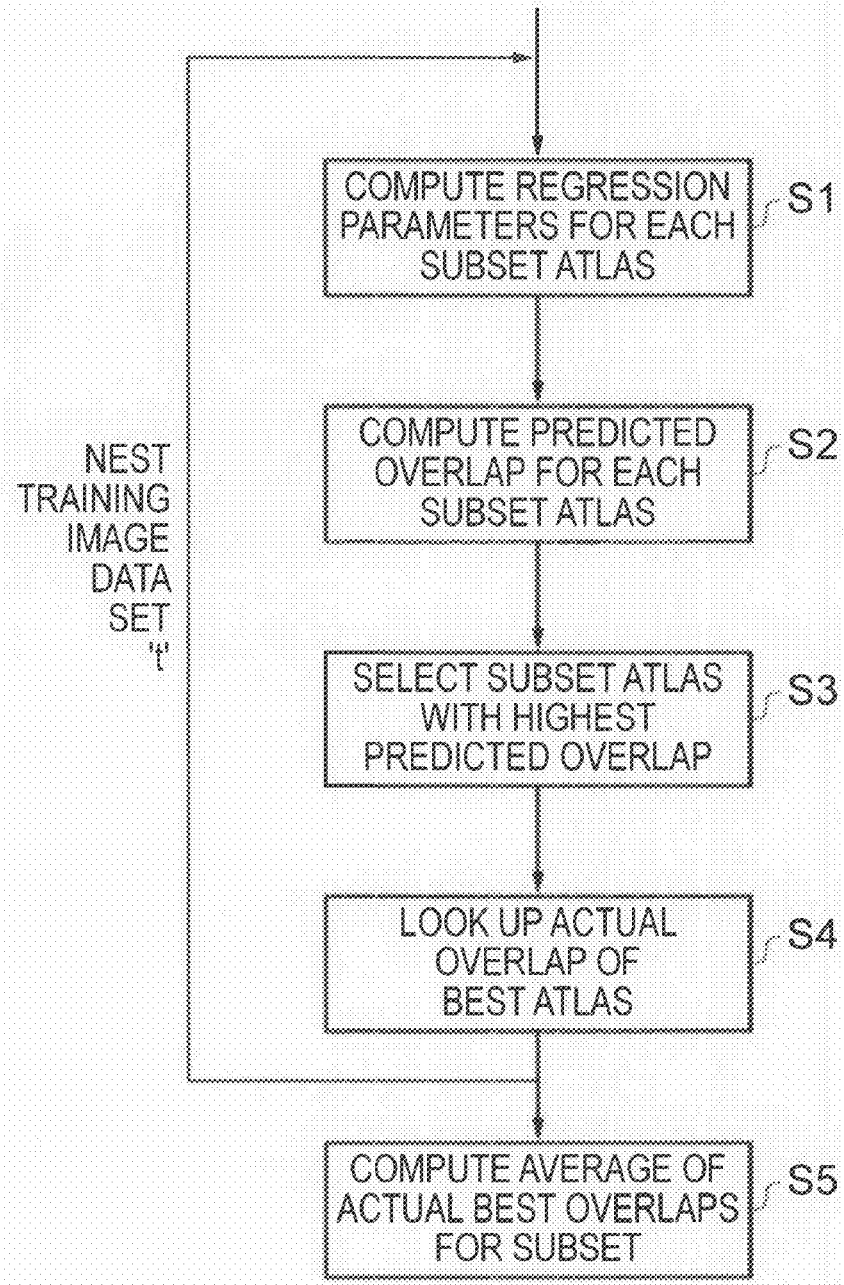
FIG. 10 is a flow diagram showing a part of the process flow for selecting the best subset of M atlases from the N candidates.

FIG. 10 is a flow chart showing how the M atlases are selected from the N candidate atlases.

In very broad terms, the method proceeds as follows. A plurality of image data sets are provided as training data to test the candidate atlases. Each of the training image data sets has already been segmented to a high standard, typically manually segmented by an expert user. Each candidate atlas is tested by using it to segment each of the training image data sets. The results of the multiple segmentations by the particular candidate atlas are then compared with the manual segmentation data. Once this has been completed for all candidate atlases, quality measures are available for all the candidate atlases, which are then used to choose the subset of M atlases from the N candidates that performs best for the training data image sets as a whole.

Figure 7:
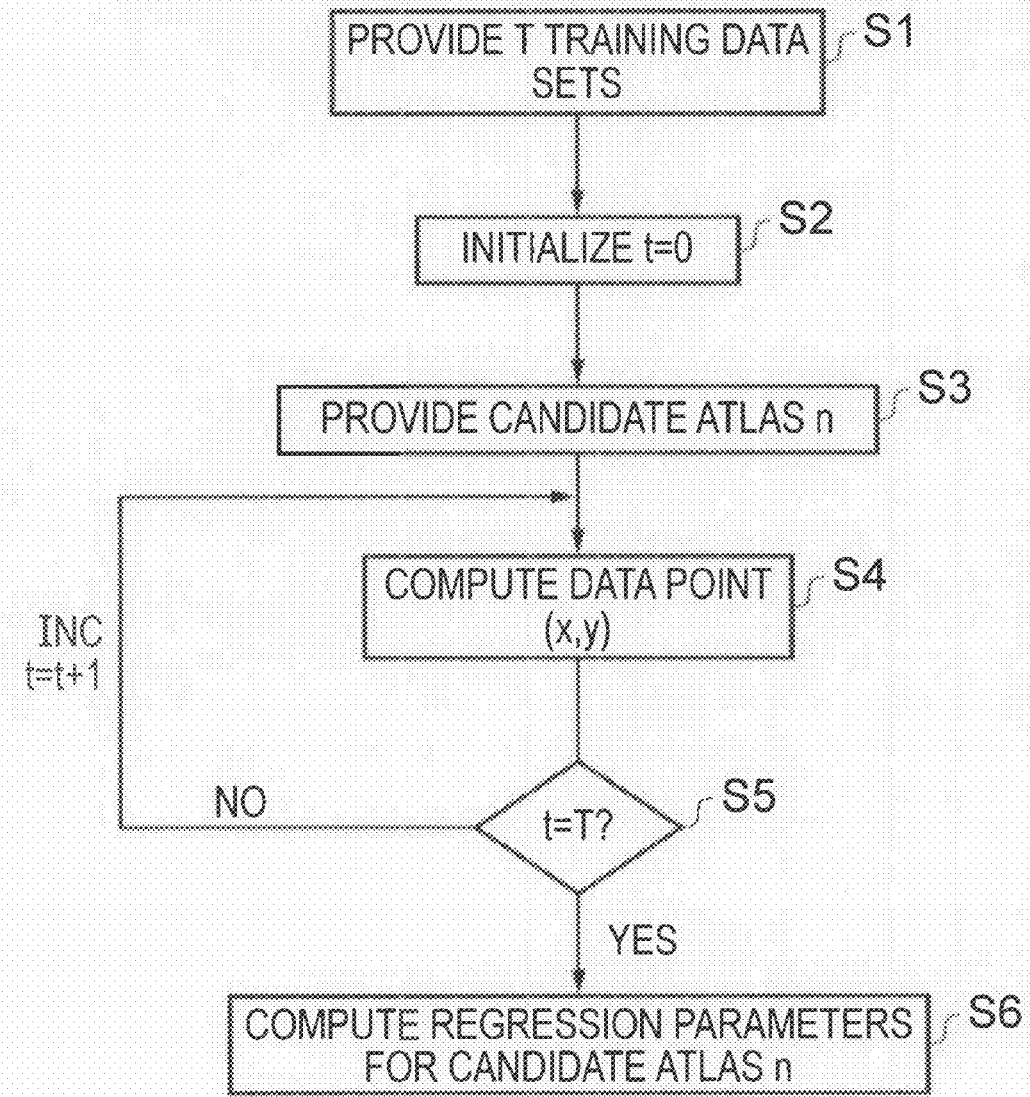
FIG. 7 is a flow chart showing how the M atlases are selected from the N candidate atlases.

FIG. 7 shows the process flow in more detail for testing one of the candidate atlases. In Step S1, T training image data sets are provided. The T training image data sets should be chosen so as to provide a reliable cross-section of the sample population, whatever that might be, and be large enough to provide a statistically reliable result. Generally T should in most cases be at least 10 to 15, probably 20. Excessively large training data sets are to be avoided for computational reasons. Typically, it is expected that the T is between 10 or 20 and 50 or 60, although much higher values of T could be used if this is computationally straightforward, and may be necessary if there are many sub-groups within the sample population. In Step S2 a counter 't' for incrementing through the training image data sets is initialized to zero. In Step S3, a candidate atlas 'n' is provided for test. In Step S4, computations are performed to segment the training image data set 't' with the candidate atlas 'n' and then to compute a data point which assesses the quality of the segmentation. Step S4 is described in more detail below with reference to FIG. 8. In Step S5, logic is carried out to check if all the training image data sets have been segmented by the candidate atlas 'n'. If no, 't' is incremented and the process flow returns to Step S3 to carry out the next segmentation. If yes, then the flow moves to the final step. Step S6 is the final step. In Step S6, all the M sets of data points obtained from the segmentation results for candidate atlas 'n' are collated using a regression analysis, and distilled into a set of regression parameters. The regression parameters and the analysis used to compute them are described in more detail below.

Figure 8:
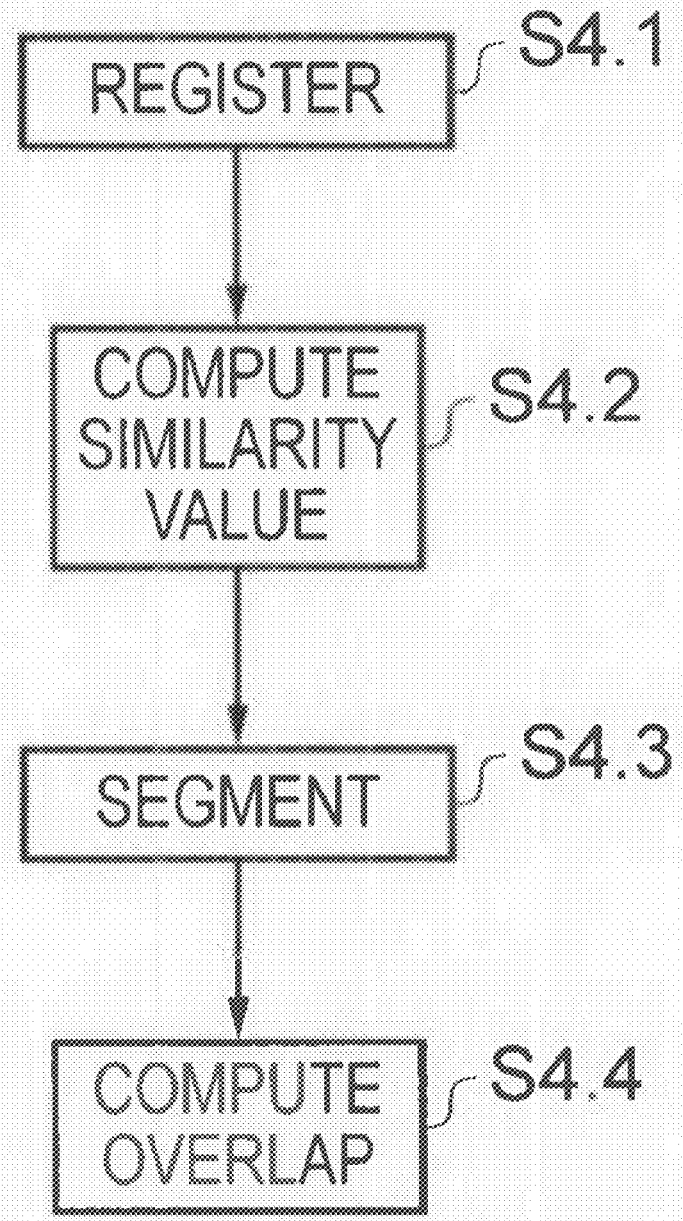
FIG. 8 is a flow diagram showing the data point generation Step S5 of FIG. 7 in more detail.

FIG. 8 is a flow diagram showing the data point generation Step S4 of FIG. 7 in more detail. In Step S4.1, registration is carried out by aligning candidate atlas 'n' with the training image data set 't'. In Step S4.2, a similarity value is calculated to determine the value of a similarity measure between the candidate atlas 'n' and the training data set 't' after registration. The similarity value may optionally be restricted to comparing data lying within a region of interest. In Step S4.3, the training image data set 't' is segmented based on the candidate atlas 'n'. In Step S4.4, the Jaccard overlap J is calculated between the segmentation result of Step S4.3 and the pre-existing segmentation data obtained from a manual segmentation. The Jaccard overlap may thus be considered to be a real, actual or true overlap in that it compares the automated result with the manual result, the latter being deemed to be fully accurate. The similarity value and the value of the overlap respectively form the x and y coordinates of the data point (x, y) referred to above in connection with FIG. 7.

When the process flow of FIG. 7 arrives at Step S6, there is a set of 't' data points (x, y). These data points are subject to a regression analysis which is schematically shown in FIG. 8.

Figure 9:
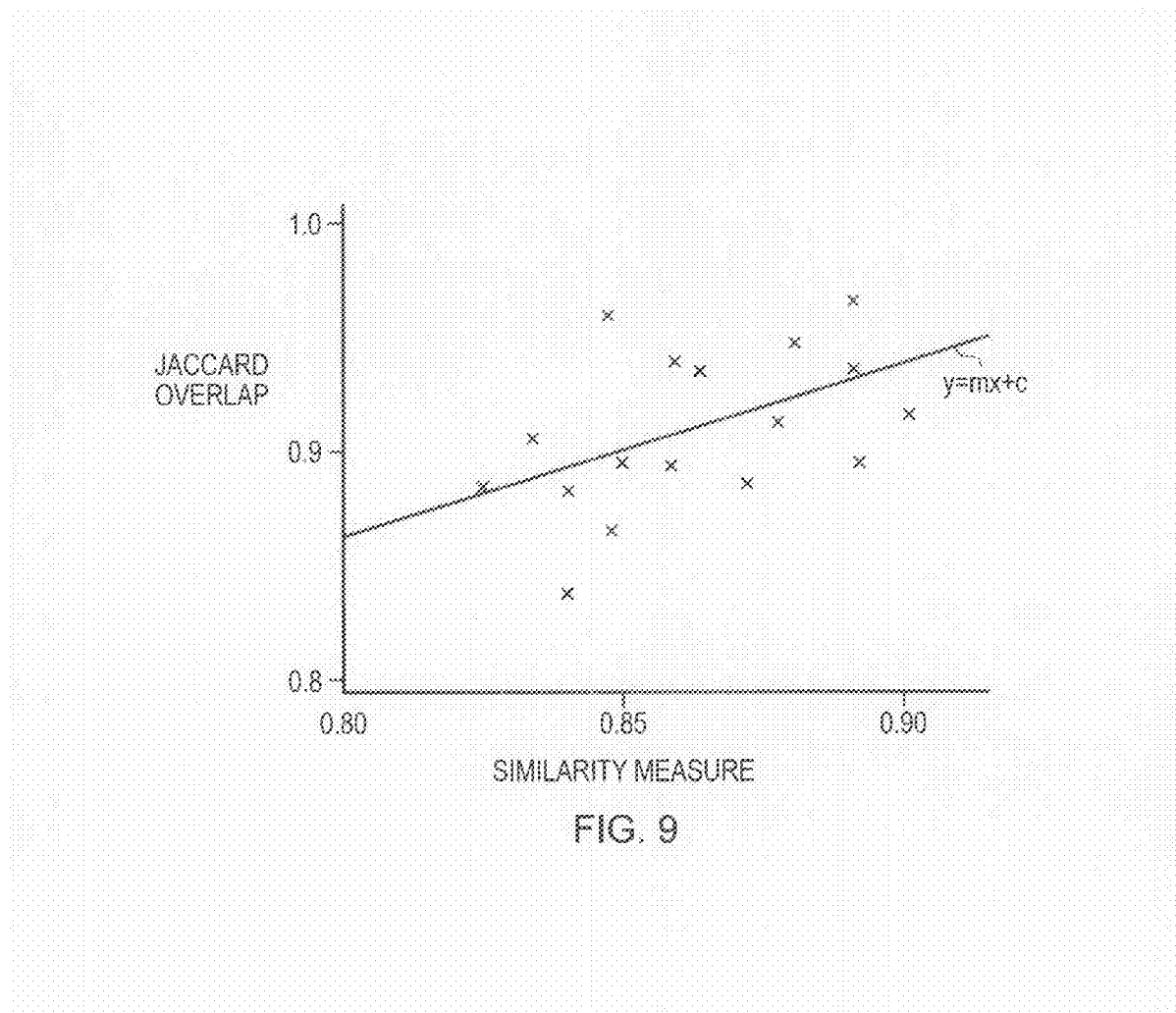
FIG. 9 is a graph of similarity measure (x-axis) against Jaccard overlap (y-axis).

FIG. 9 is a graph of similarity measure (x-axis) against Jaccard overlap (y-axis) with each of the individual data points plotted as crosses. Step S7 involves a linear regression on the data points to determine a slope and intercept according to the standard linear formula y=mx+c. The slope and intercept are the regression parameters referred to above.

The significance of this result is that the regression parameters allow a similarity value to be converted into an estimated or predicted Jaccard overlap, which can be used as a proxy for real Jaccard overlap, which in general is a more reliable measure of quality of the atlas than the similarity value itself.

Once all the candidate atlases have been processed by repeated 'n' times application of the flow of FIG. 7, there is a set of regression parameters $(m_n, c_n)$ computed for all N candidate atlases.

The next task is to make a selection of the best subset of M atlases from the N candidates.

Each of the permutations of M atlases among the N candidates needs to be considered in turn. For example, if there are 21 candidate atlases and the multi-atlas data set is to have 3 atlases, i.e. M=3 and N=21, then one permutation is the 2nd, 5th and 18th candidate atlas. Each permutation can thus be termed a candidate multi-atlas data set which is a subset of the candidate atlases. In the following the candidate multi-atlas data set is referred to as 'A' and each atlas in this subset 'a'. Moreover, the atlas 'a' which performs the best at segmenting any particular training image data set is referred to as 'a*'.

FIG. 10 is a flow diagram showing a part of the process flow for selecting the best subset of M atlases from the N candidates. The part shown relates to the processing of each individual permutation of M atlases, so will be repeated as many times as there are permutations.

In Step S1, the regression parameters are computed for each atlas 'a' in the subset 'A'. (If the training image data set is a separate set from the candidate atlases, these will already be known from FIG. 7, Step S6, so would not need to be recalculated.)

In Step S2, for each atlas 'a' the predicted overlap is calculated by applying the similarity value to the regression parameters.

In Step S3, the atlas 'a*' with the highest overlap among all of 'a' is identified.

In Step S4, the actual overlap value of atlas 'a*' with the manual segmentation is looked-up from memory, this value having been previously calculated in FIG. 8, Step S4.4. This overlap value thus represents the best overlap achieved among all atlases 'a' in the subset 'A' when applied to training image data set 't'.

Steps S1 to S4 are repeated 'T' times for each training image data set 't' in turn.

In Step S5, the results are collated by computing the average of the overlaps calculated in Step S4, to provide a single value representing the goodness of subset 'A'.

The whole process of FIG. 10 is then repeated through all possible permutations.

The final part of the method is then to determine the subset A* with the highest overlap among all the subsets A.

Figure 11:
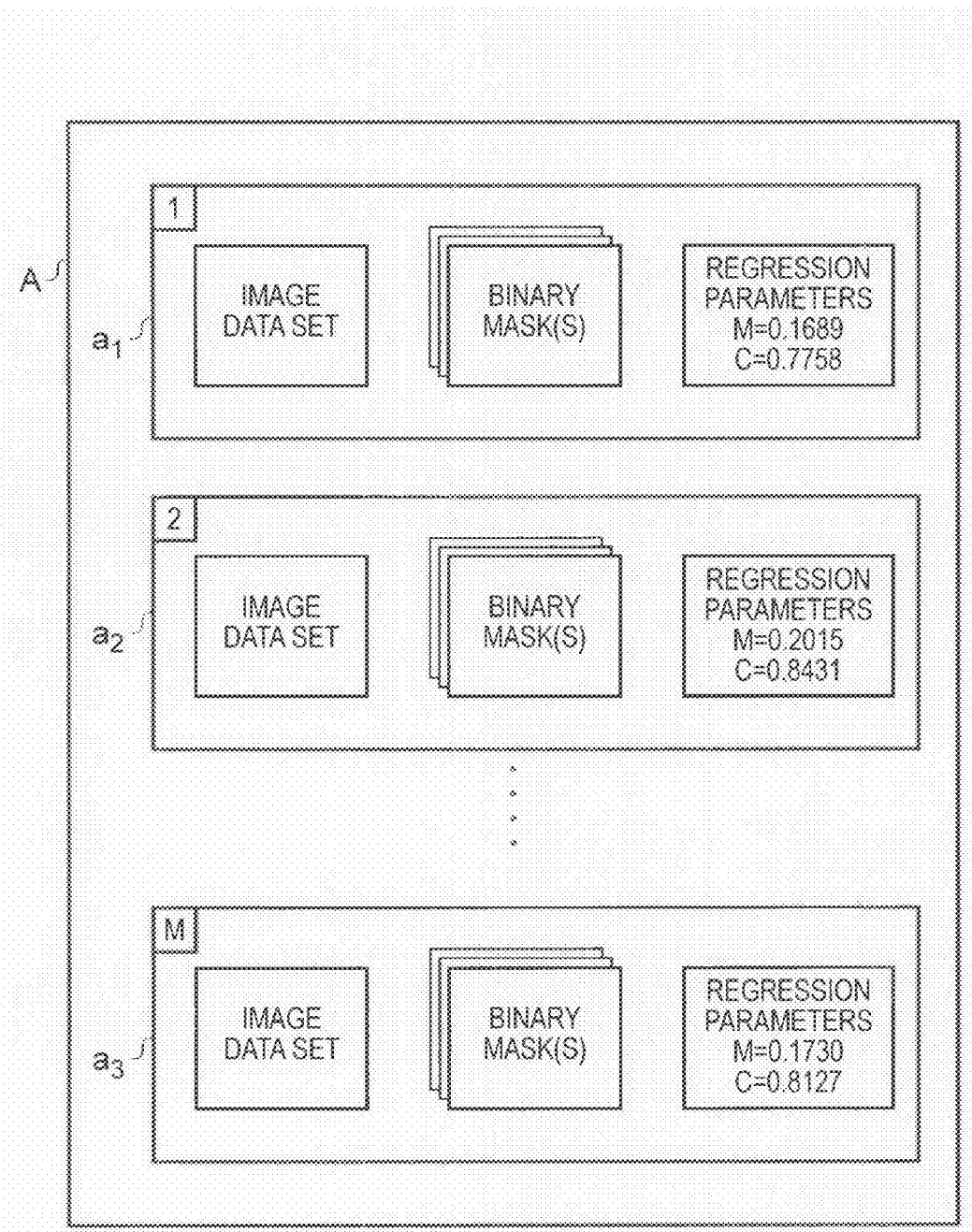
FIG. 11 depicts a multi-atlas data set.

FIG. 11 depicts the output of the method, namely a multi-atlas data set A comprising a plurality of atlases $a_m$ with each atlas comprising an image data set, segmentation data and the regression parameters. The image data set will typically be a raw or slightly processed image data set, e.g. a gray scale CT image data set. The segmentation data will typically be stored as one or more binary masks, with each mask identifying one object or part of an object in the image data set, as obtained from a manual segmentation. The regression parameters will typically be linear regression parameters for slope and/or intercept. The regression parameters will be used in the live system, to be described below, to compute predicted overlap values.

EXAMPLE

An example procedure for selecting the best set of atlas data sets to use for multi-atlas based segmentation is now described.

Cardiac CT angiography (CCTA) data sets from 21 patients were used to construct the training set. The data sets represent two distinct categories of heart anatomy: patients with small cardiothoracic ratio (CTR), and patients with large cardiothoracic ratios. Data sets 9, 12, and 16-21 were identified as being from patients with large CTRs. Whole heart segmentations, represented as masks containing the heart and all its sub-anatomies, were collected by a clinically qualified individual on each of these data sets. Each data set in turn is used as an atlas to segment the heart in all the other data sets. The segmentation is performed using multi-scale rigid registration to align the volumes based on 3-D translation, anisotropic scaling and rotation, followed by multi-scale non-rigid registration, which uses mutual information to find the best deformation field within fluid and elastic constraints. More details can be found in William R. Crum, Derek L. G. Hill, and David J. Hawkes. Information theoretic similarity measures in non-rigid registration. In IPMI, pages 378-387 (2003) the contents of which is incorporated herein in its entirety.

The final mutual information between the atlas data set and the novel data set, along with the correlation coefficient between the two aligned volumes, the correlation coefficient between the two volumes measured on a shell created around the boundary of the heart, and the final segmentation accuracy measured using the Jaccard overlap (the Jaccard coefficient) are collected from each segmentation.

$$\text{Jaccard}(A, B) = \frac{Vol.(A \cap B)}{Vol.(A \cup B)}$$

These measurements make up the training parameters and they are presented in separate cross-segmentation matrices, J, MI and CC, where J(r, c) is the segmentation accuracy produced when atlas c is used to segment the heart in data set r, and MI(r, c) is the optimal mutual information between atlas data set c and novel data set r. The diagonal elements represent parameters collected from self-segmentation.

The parameter model used in this system is a univariate least-squares regression function measured on each similarity measure for each atlas. The function has the form $$\hat{y} = \hat{\beta}_1 x + \hat{\beta}_0$$

The function correlates mutual information or correlation coefficient with segmentation accuracy. It is therefore possible to compute a predicted segmentation accuracy obtained if atlas data set c is used to segment the heart in data set r based on the measured correlation coefficient between the two at the region-of-interest (ROI).

FIG. 12A is a table showing the cross-correlation (CC) values between the image data sets of the sample population which is used both as training data and candidate atlases with a leave-one-out strategy. These values are the similarity values calculated in Step S4.2 of FIG. 8 in the case that CC is the similarity measure. The file names of the data sets (e.g. 1798_020) are displayed as row and column headers in the matrix. The columns represent the atlas data sets, while the rows represent the training data sets.

FIG. 12B is the corresponding table to FIG. 12A but for mutual information (MI). The individual values in each cell of the table are the similarity values calculated in Step S4.2 of FIG. 8 in the case that MI is the similarity measure.

FIG. 12C is the corresponding table to FIG. 12A but for Jaccard overlap (J). These values are the overlap values calculated in Step S4.4 of FIG. 8, i.e. they indicate the real or actual overlap obtained by comparing the automated segmentation and the manual segmentation.

The diagonal elements of the matrices or tables, which are shaded, are self-segmentation parameters which carry no useful information regarding the efficacy of the candidate atlas. These are discarded from consideration in the later processing as described below.

The cells marked with dashed and dotted lines show cases respectively where the similarity measure (CC or MI) between a novel data set and a first atlas is higher than the similarity measure between the same a novel data set and a second atlas, but the resulting Jaccard overlap is lower.

Figure 13A:
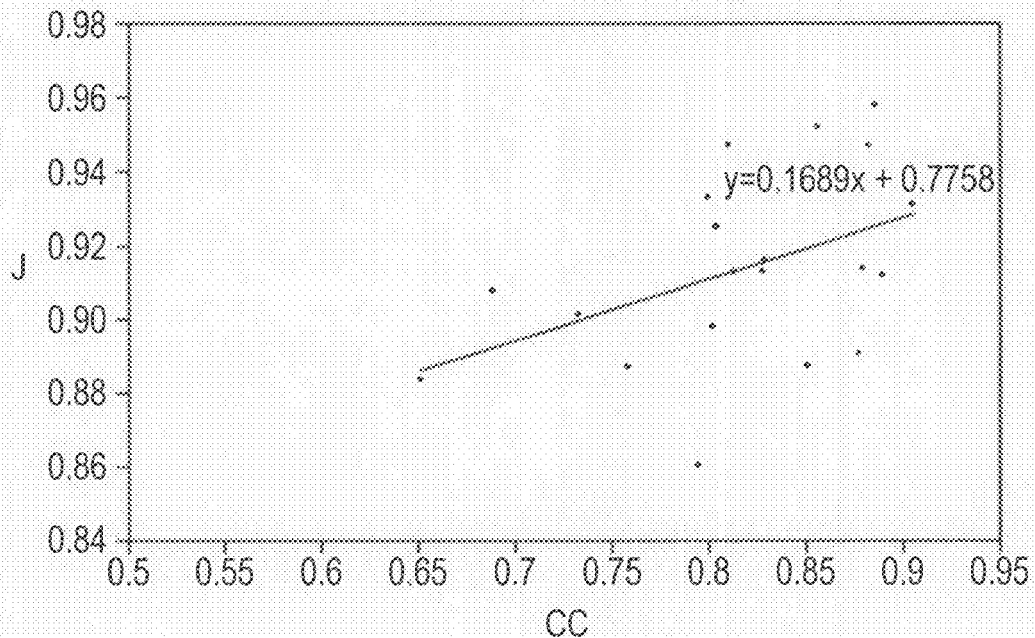
FIG. 13A is a graph plotting Jaccard overlap J (y-axis) against cross-correlation CC (x-axis).

FIG. 13A is a graph plotting Jaccard overlap J (y-axis) against cross-correlation CC (x-axis). The individual data points for CC and J are taken from the matrices as shown in FIGS. 12A and 12C respectively. The straight line is the regression function calculated from the data points.

In reality, no graph is plotted, but rather the regression parameters are calculated using the following equations for slope and intercept respectively:

$$\hat{\beta}_{1CC} = \frac{\sum_{T}^{M-1}(CC(r, c) - E(CC(*,c)))(J(r,c) - E(J(*,c)))}{\sum_{T}^{M-1}(CC(r, c) - E(CC(*,c)))(CC(r,c) - E(CC(*,c)))}$$

$$\hat{\beta}_{0CC} = E(J(*, c)) - \hat{\beta}_{1CC} E(CC(*,c))$$

These two parameters for slope and intercept can then be used to compute a predicted overlap using the following equation:

$$J^*_c = \hat{\beta}_{1sim} x_{sim} + \hat{\beta}_{sim},$$

which in the case of using cross-correlation as the similarity measure becomes:

$$J^*_c(r) = CC(r,c) * \hat{\beta}_{1CC} + \hat{\beta}_{0CC}$$

Figure 13B:
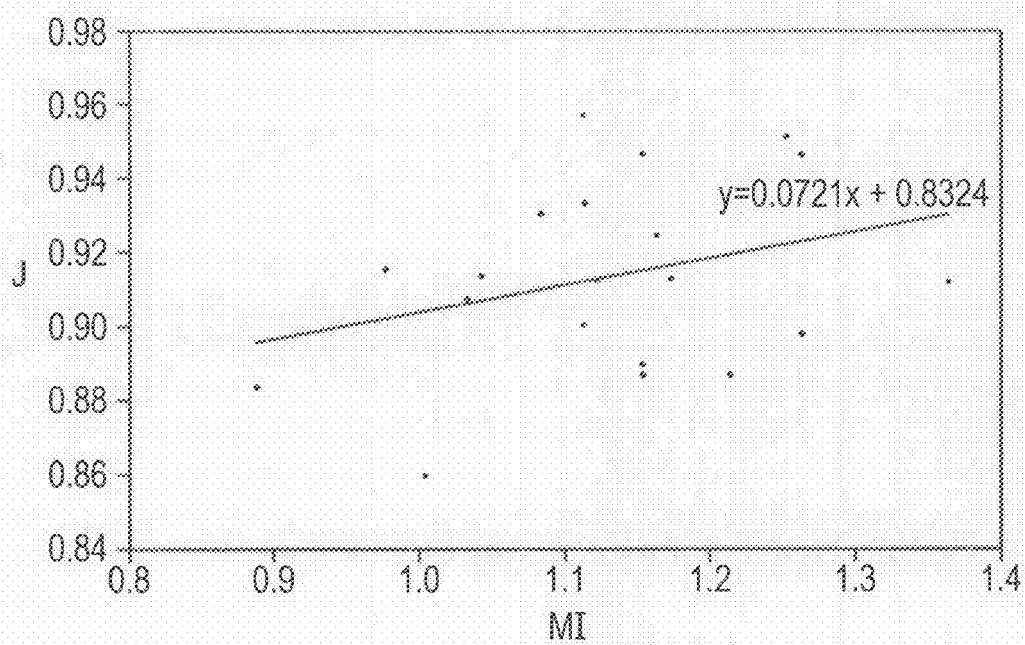
FIG. 13B is similar to the graph of FIG. 13A, but for mutual information MI instead of cross-correlation CC.

FIG. 13B is similar to the graph of FIG. 13A, but is based on using mutual information instead of cross-correlation. The graph plots Jaccard overlap J (y-axis) against mutual information MI (x-axis). The individual data points for MI and J are taken from the matrices as shown in FIGS. 12B and 12C respectively. The straight line is the regression function calculated from the data points.

Comparing FIGS. 13A and 13B, it can be seen that the CC data has a greater slope than MI data. In other words, CC is more sensitive to overlap than MI. This suggests that CC will be more reliable for computing predicted overlap J* than MI in this particular example atlas. In other cases, the slope of the line is close to zero, while the intercept is quite high, indicating that the atlas is a good atlas generally, but one in which the similarity measure provides no information about the segmentation accuracy.

Using the per atlas regression functions $J^*_c$ and the Jaccard overlap matrix J this stage uses the regression functions to predict the segmentation overlap and compares the predicted overlap value $J^*_c(r)$ to the actual overlap value collected during training J(r, c).

The following information is obtained:
1. Correlation:

$$\rho(J^*_c(r), J(r,c))$$

A value close to +1 indicates a strong prediction power.
2. Mean Absolute Error:

$$\frac{1}{N} \sum_{r=0}^{N-1} |J^*_c(r) - J(r, c)|$$

This is the average of the discrepancy between the predicted overlap and the actual overlap produced by the particular atlas over all the data sets. The best single atlas is generally the atlas with the lowest mean error.
3. Standard Deviation of the Error:

$$\sigma(J^*_c(r) - J(r,c))$$

This is a measure of the distribution of the discrepancy between the predicted overlap and the actual overlap produced by the particular atlas over all the data sets. A low value of this statistic indicates a stable atlas.

4. Maximum Absolute Error:

$$\max_{r=0}^{N-1} |(J^*_c(r) - J(r,c))|$$

The maximum discrepancy between the predicted overlap and the actual overlap produced by the particular atlas over all the data sets.

5. P-Value of Zero Correlation:

The probability of getting a correlation as large as the observed value by random chance, when the true correlation is zero. The lower this value is, the higher the confidence in the observed correlation coefficient.

Figure 14:
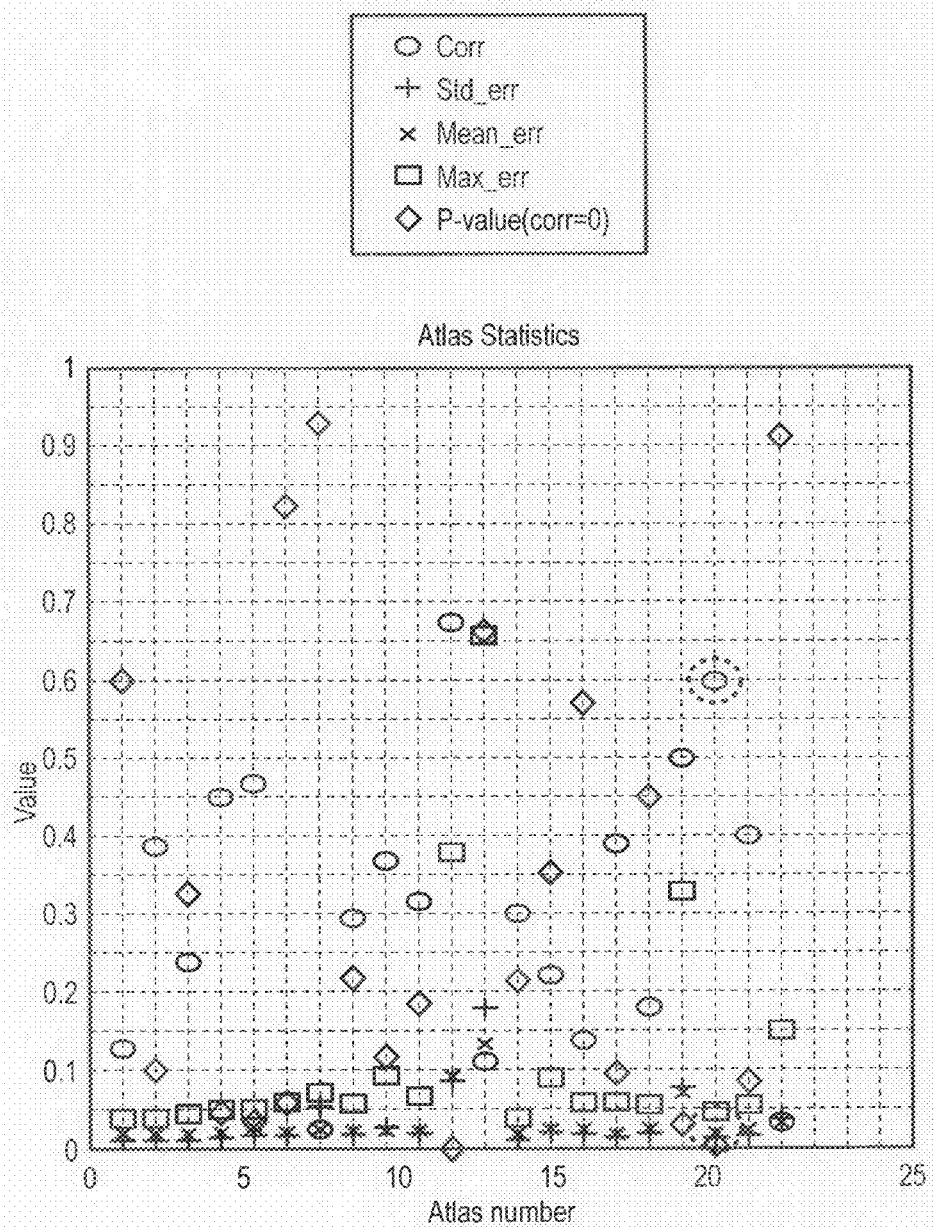
FIG. 14 is a plot of the atlas statistic values (y-axis) for the different atlases (x-axis).

FIG. 14 is a plot of the atlas statistic values (y-axis) for the different atlases (x-axis) used. The figure shows a set of atlas statistics for atlas 19. It can be seen that atlas 19 appears to be a good predictor, because it has both high correlation coefficient values and low mean absolute error between its predicted overlap values and the actual overlap values.

Figure 15:
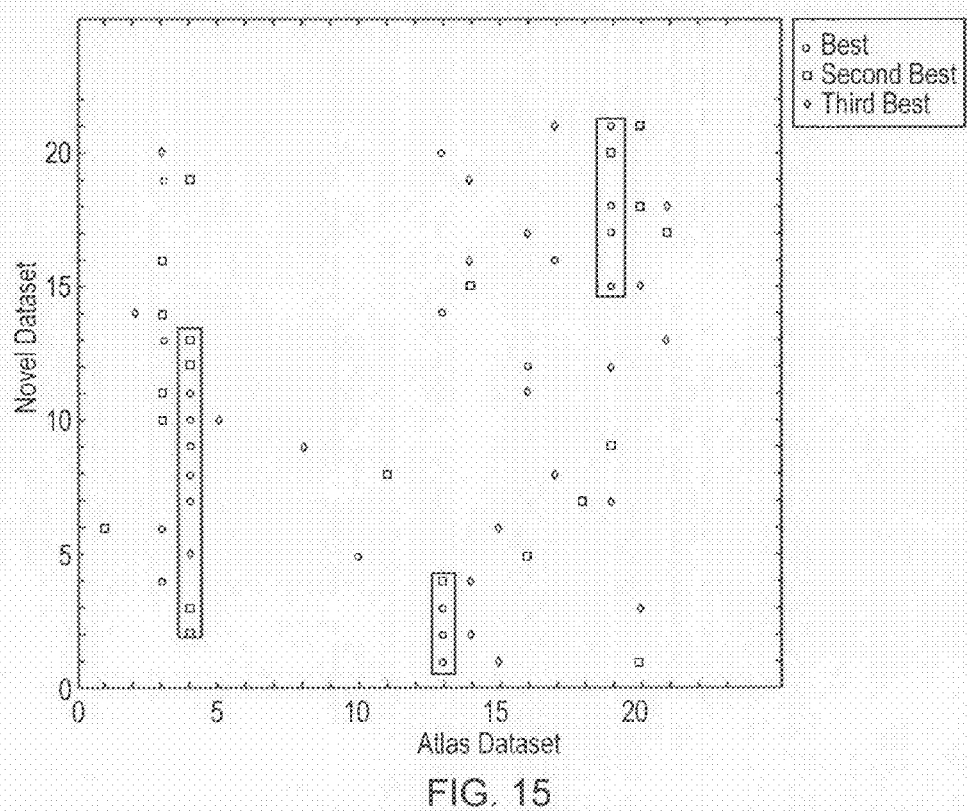
FIG. 15 is a plot of atlas data set against novel data set with the first, second and third best atlases at segmenting each novel data set being marked with circles, squares and diamonds respectively.

FIG. 15 is a plot of atlas data set against novel data set with the first, second and third best atlases at segmenting each novel data set being marked with circles, squares and diamonds respectively. The plot provides information about which data sets are best suited for certain categories. Data sets 9, 12 and 16 to 21 all belong to the group with high CTRs. The cluster in the top-right corner indicates that atlases from this category, particularly atlas 19 are the best for segmenting hearts within this group. Atlas 4 generates the best segmentation accuracy over data sets 2 to 14.

The next stage in the method is to select the best subset of M atlases from among the larger group of N candidate atlases to form the multi-atlas data set. This is the stage described above with reference to FIG. 10. The purpose of this stage is to select the combination of M atlases that produces the highest overall average segmentation accuracy, while using the regression function to decide on which atlas to use on each novel data set. The end goal is to find out whether this combination represents all categories present in the training population, and whether it is capable of producing a more accurate segmentation than using only one atlas.

In this case, M increased sequentially from 2, leading to combinations of atlases in each iteration.

The procedure is as follows for each combination or permutation A where A={$a_0, \ldots a_{M-1}$}. The following procedure is then repeated for all permutations.

For each i of the remaining N-M training data sets:

Compute the regression functions $J^*_a$ for each atlas a in A, excluding data set i from the observations. The slope for the leave-one-out strategy is as follows:

$$\hat{\beta}_{1SIM} = \frac{\sum_{r=0|r\neq i}^{N-M-1} (SIM(r,c) - E(SIM(*,c)))(J(r,c) - E(J(*,c)))}{\sum_{r=0|r\neq i}^{N-M-1} (SIM(r,c) - E(SIM(*,c)))(SIM(r,c) - E(SIM(*,c)))}$$

where SIM is the cross-segmentation matrix containing the image similarity measure used to predict overlap.

Compute the predicted overlap for data set i $$J^*_a(i) = \hat{\beta}_{1SIM_a} SIM(i,a) + \hat{\beta}_{0SIM_a}$$

Select the atlas 'a*' among the atlases 'a' of subset 'A' which has the highest predicted overlap.

$$a^* = \underset{a}{\mathrm{argmax}}\, J^*_a(i)$$

Collect the actual overlap produced by a* on i from the overlap matrix J.

$$J(i) = J(i, a^*)$$

Then, compute the average segmentation overlap for the subset A according to:

$$J_A = \frac{1}{N-M} \sum_{i=0}^{N-M-1} J(i)$$

Once all permutations have been worked through, the subset of atlases A with the highest average overlap is selected according to:

$$A^* = \underset{A}{\mathrm{argmax}}\, J_A$$

In this way, the multi-atlas data set can be selected in a fully automated manner by a computer.

In this example, the best set of 2 atlases, i.e. M=2, was atlases 4 and 19. These data sets are significantly different in terms of heart shape and CTR, representing the 2 main categories identified in FIG. 15. It is evident that atlas 4 is more suitable for segmenting data sets 2 to 14, while atlas number 19 is more suitable for segmenting data sets 16 to 21. These data sets have already been identified as separate groups based on distance of the apex to the rib-wall in each case. When M is increased to 3, atlas 13 joins the set. From FIG. 15, it can be seen that this data set is suitable for segmenting data sets 1 to 4.

In the case that M is increased to 4 an overall average segmentation accuracy of 92.8% was achieved compared to the best single atlas, which generated an average accuracy of 91.5%. This performance was achieved by using the cross-correlation confined to a region of interest containing the heart apex and the rib-wall.

Figure 1:
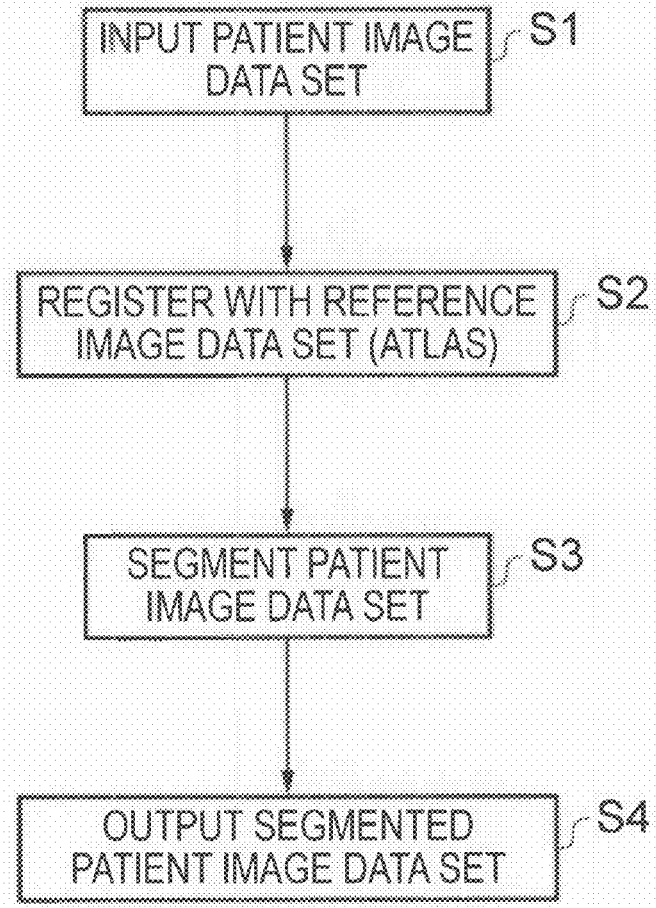
FIG. 1 is a flow chart showing the principal steps of a basic segmentation process according to the prior art.
Figure 2:
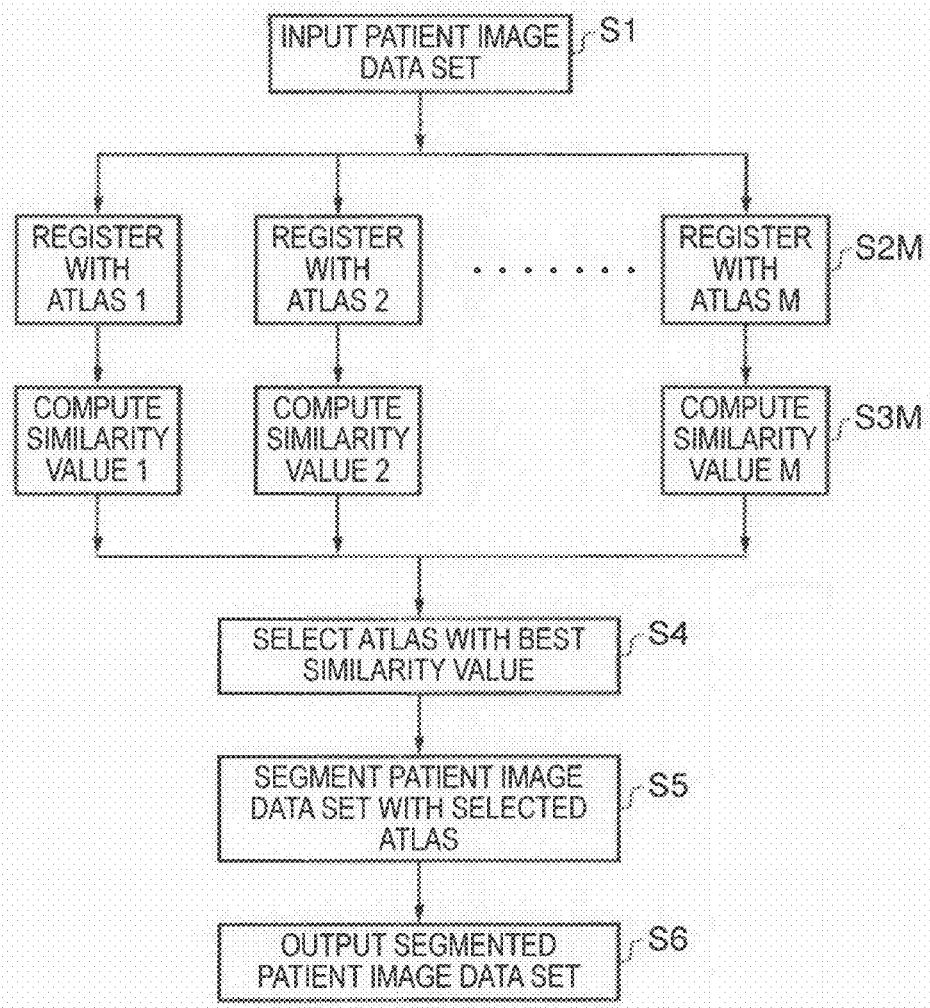
FIG. 2 is a flow chart showing the principal steps of an example multi-atlas segmentation process according to the prior art.
Figure 16:
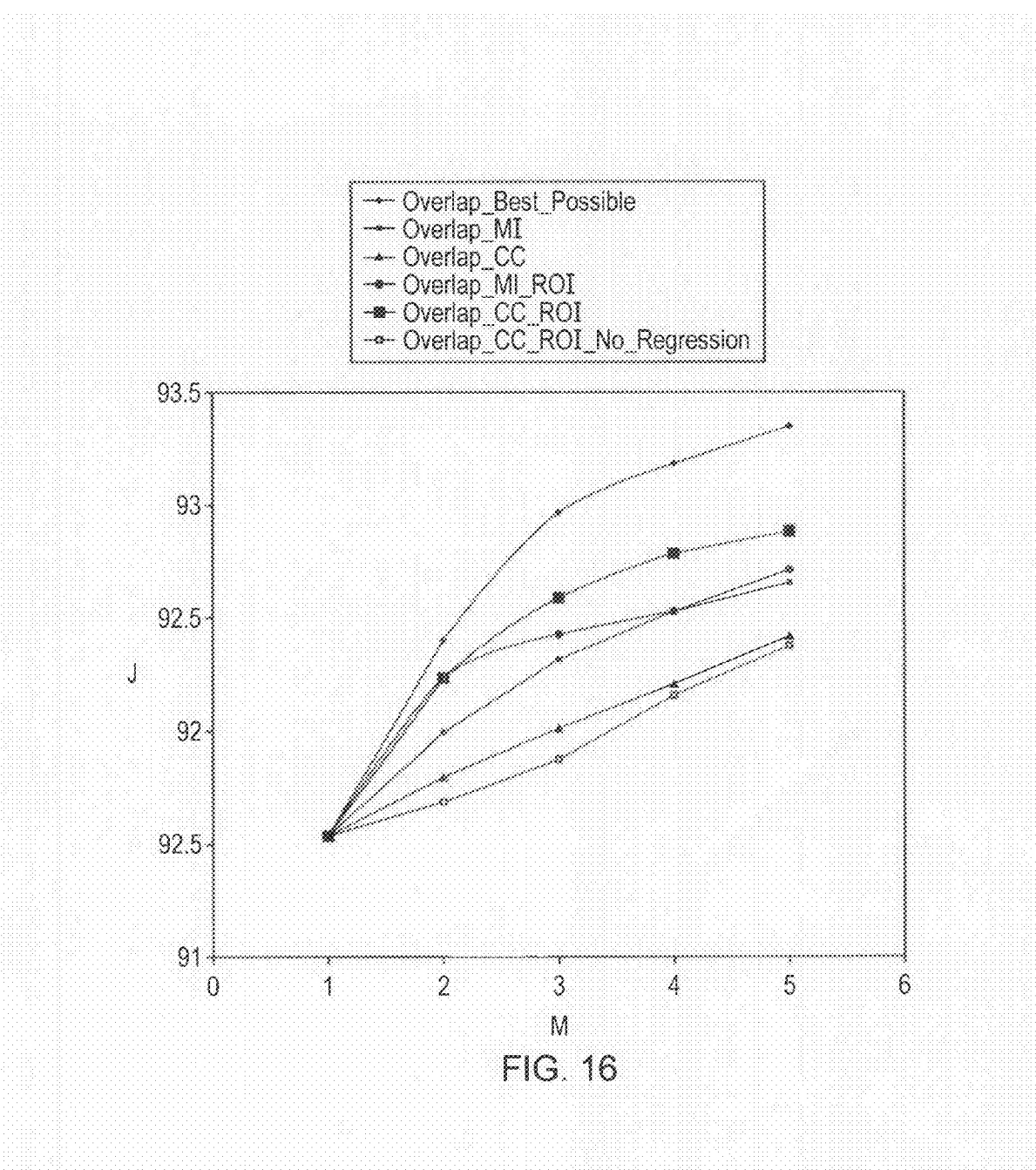
FIG. 16 shows the average heart segmentation overlap generated by multi-atlas data sets ranging from M=1 to 5 inclusive.

FIG. 16 shows the average heart segmentation overlap generated by multi-atlas data sets ranging from M=1 to 5 inclusive. The uppermost line (diamonds) shows the best possible segmentation overlaps that can be generated if the most suitable atlas was selected from the set of M in every case. In other words, this line presupposes the atlases were selected based on the actual overlaps, rather than based on predicted overlaps. The best performing of the selections based on computed predicted overlap is ROI-restricted cross-correlation (larger solid squares). Other illustrated examples of selections based on predicted overlap are ROI-restricted mutual information (circles), whole volume MI (smaller solid squares) and whole volume CC (triangles). For reference, the hollow squares show results from a prior art approach, namely a method according to FIG. 2 using CC as the similarity measure and also restricted to a ROI. As is evident, the prior art approach performs worst for all M greater than 1. It is also clear from the graph that the ROI-based measures, particularly cross-correlation, are better predictors than the same similarity metrics measured on the entire volumes.

The description of the example is now completed.

A method is now described for segmenting a novel image data set to mark an object of interest therein.

Namely, the method comprises: (a) providing a multi-atlas data set comprising a plurality of atlases, each atlas containing a reference image data set and segmentation data which marks an object of interest within the reference image data set; (b) inputting a novel image data set for segmentation; (c) registering the image data set with each of the atlases; (d) selecting one of the atlases to use for segmentation based on the registration; (e) segmenting the novel image data set based on the selected atlas; and (f) outputting the novel image data set with the associated segmentation data, so that the object of interest in the novel image data set is marked; wherein each atlas further comprises regression parameters representing results of a regression analysis between (i) real overlap between the atlas and a set of training image data sets, and (ii) a similarity measure between the atlas and the set of training image data sets; and wherein the segmentation is carried out by: (a) computing a value of the similarity measure for each of the registrations; (b) obtaining a predicted overlap for each of the registrations by applying the respective regression parameters to the respective values of the similarity measure; and (c) selecting one of the atlases to use for the segmentation based on the predicted overlaps. The regression analysis may be based on a linear regression function. Higher order linear or non-linear regression functions could also be used.

The similarity measure can be chosen according to the particular imaging application at hand and may be cross correlation, mutual information, or normalized mutual information.

The similarity measure could be computed from the whole image data set, but in some cases is computed based on a region of interest within the image data set. The region of interest may correspond to the object of interest, i.e. the object to be segmented, or may be otherwise defined by a further object or region of interest which may be a superset or subset of the region occupied by the object to be segmented.

A computer program product bearing machine readable instructions for carrying out the method is disclosed.

A computer loaded with and operable to execute machine readable instructions for carrying out the method is disclosed.

A computer program product is disclosed on which is stored a multi-atlas data set comprising a plurality of atlases, each atlas containing a reference image data set, segmentation data which marks an object of interest within the reference image data set, and regression parameters representing results of a regression analysis between (i) real overlap between the atlas and a set of training image data sets, and (ii) a similarity measure between the atlas and the set of training image data sets.

Figure 17:
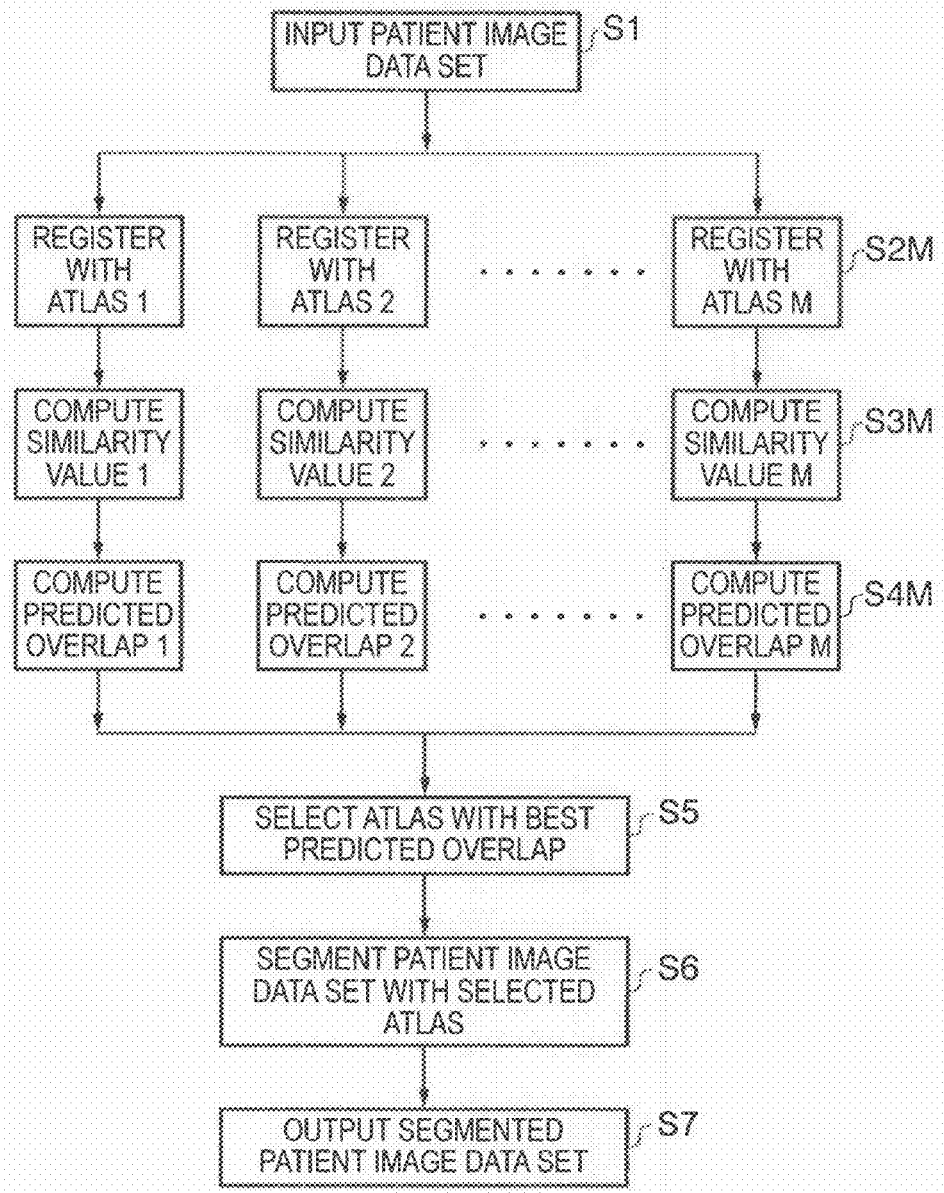
FIG. 17 is a flow chart showing the steps of an example multi-atlas segmentation process based on M atlases.

FIG. 17 is a flow chart showing the steps of an example multi-atlas segmentation process based on M atlases, where M is a positive integer of 2 or more, typically 2, 3, 4 or 5.

In Step S1, a novel image data set is provided to a computer for segmentation.

In Step S2M, each of the M atlases is aligned with the novel image data set. As illustrated, this is essentially a parallel process, since each of the registrations is independent of the others.

In Step S3M, values of a common similarity measure is computed for each pair of registered images, which could for example be mutual information (MI), normalized mutual information (NMI) or cross-correlation (CC). The similarity measure will be the same one as used for the stored regression parameters that are part of the atlases.

In Step S4M, the similarity measure values are applied to the regression function to compute a predicted overlap value for each of the M atlases.

In Step S5, the atlas with the best, i.e. highest, predicted overlap value is identified and selected to be the one to use for segmenting the novel image data set.

In Step S6, the registered novel image data set is segmented using the selected atlas.

In Step S7, the segmented novel image data set, i.e. the novel image data set and the associated segmentation data, is output.

Figure 18:
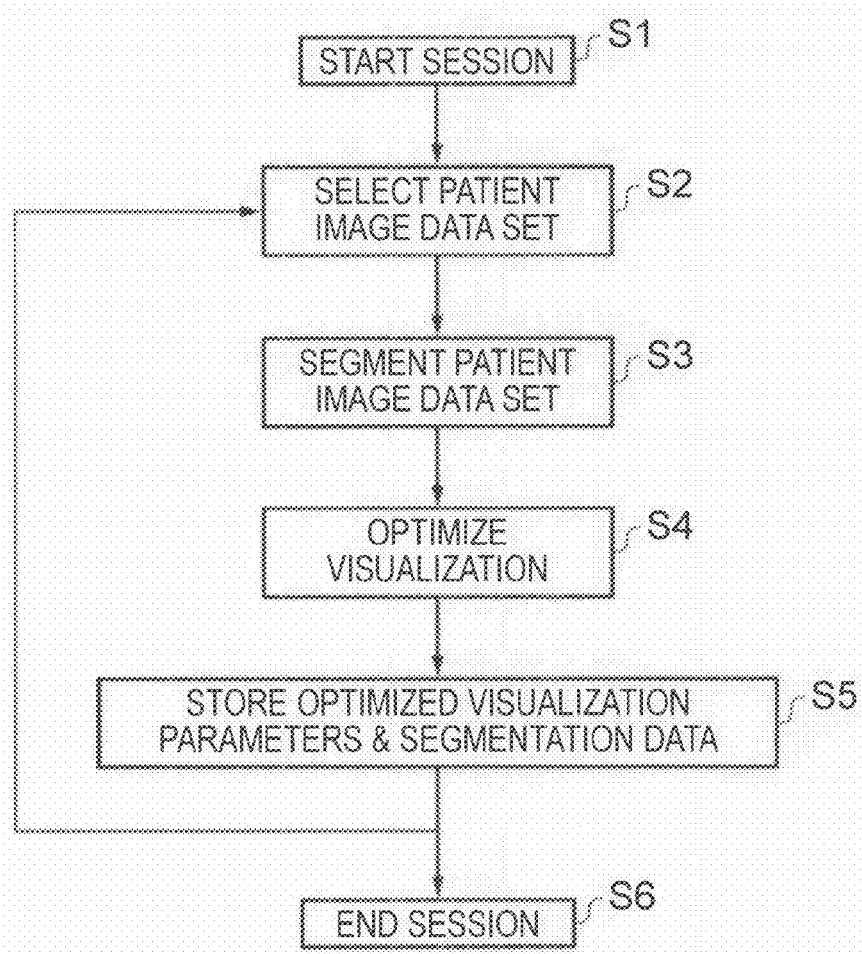
FIG. 18 is a flow chart of a session that may be carried out in a live system in which the process flow of FIG. 17 is a part.

FIG. 18 is a flow chart of a session that may be carried out in a live system in which the process flow of FIG. 17 is a part. The session may be carried out on a computer as described above with reference to FIG. 4 and FIG. 5. Moreover, the session may be carried out over a network as illustrated in FIG. 6. The novel image data sets that are viewed during the session may be accessed over a network, for example in a client-server arrangement with the image data sets stored on a database remote from the computer (client) at which the user who initiates the session is working.

In Step S1, a user initiates a session of a visualization applications program, for example one for volume rendering 3D medical image data.

In Step S2, the user selects a patient image data set for visualization. The data may then loaded into system memory and/or cache from a local or remote mass storage device, as will be understood from the description of FIGS. 4, 5 and 6 above. The patient image is then visualized for the user on a display device.

In Step S3, the user selects on the display device an object of interest within the image. This selection triggers a segmentation process according to the method of FIG. 17. The results of the segmentation are then used to update the image display, for example to mark the segmented volume a different color or opacity, or to remove all parts of the data set from visualization that are not part of the segmented volume. For example, if the patient image data set is of a thoracic CT scan, and the segmented volume is the heart, then after segmentation, the image displayed could be of the heart only.

In Step S4, the user may optimize visualization parameters, for example by applying a presets which assigns different colors to different opacity ranges in the data set.

In Step S5, the optimized visualization parameters and segmentation data are stored, preferably associated with the image data set. Linking of data can be carried out within the DICOM standard as is well known, either by having separate linked DICOM files, or by embedding data in the DICOM header of the file that contains the image data.

Following Step S5, the user may view further patient image data sets, as indicated in the figure with the feedback loop arrow.

Finally, the session is ended in Step S6 at the user's behest.

Examples of a computer program product bearing machine readable instructions for carrying out the method described with reference to FIGS. 7 to 11 are the mass storage device HDD 30 of FIG. 4, the ROM 26 of FIG. 4, the RAM 28 of FIG. 4 and the system memory 46 of FIG. 5, and the servers 156 or 170 of FIG. 6. Other forms of computer program product include a spinning disk based storage device such as a CD or DVD, or a USB flash memory device.

Examples of a computer loaded with and operable to execute machine readable instructions for carrying out the method described with reference to FIGS. 7 to 11 are the computer of FIG. 4, the computer of FIG. 5, and individual elements, e.g. terminals 154 or collective multiple elements of the computer network system shown in FIG. 6, e.g. server 156 or 170 in combination with one or more of the terminals 154 or computers provided with the medical imaging devices 160, 162, 164 or 166.

Examples of a computer program product bearing machine readable instructions for carrying out the method described with reference to FIG. 16 or 17 are the mass storage device HDD 30 of FIG. 4, the ROM 26 of FIG. 4, the RAM 28 of FIG. 4 and the system memory 46 of FIG. 5, and the servers 156 or 170 of FIG. 6. Other forms of computer program product include a spinning disk based storage device such as a CD or DVD, or a USB flash memory device.

Examples of a computer loaded with and operable to execute machine readable instructions for carrying out the method described with reference to FIG. 16 or 17 are the computer of FIG. 4, the computer of FIG. 5, and individual elements, e.g. terminals 154 or collective multiple elements of the computer network system shown in FIG. 6, e.g. server 156 or 170 in combination with one or more of the terminals 154 or computers provided with the medical imaging devices 160, 162, 164 or 166.

Examples of a computer program product on which is stored a multi-atlas data set of the kind shown in FIG. 11 comprising a plurality of atlases, each atlas containing a reference image data set, segmentation data which marks an object of interest within the reference image data set, and regression parameters representing results of a regression analysis between (i) real overlap between the atlas and a set of training image data sets, and (ii) a similarity measure between the atlas and the set of training image data sets are the mass storage device HDD 30 of FIG. 4, the ROM 26 of FIG. 4, the RAM 28 of FIG. 4 and the system memory 46 of FIG. 5, and the servers 156 or 170 of FIG. 6. Other forms of computer program product include a spinning disk based storage device such as a CD or DVD, or a USB flash memory device.

Embodiments of the invention may include incorporating the methods and associated computer programs described herein as a component in a volume rendering application.

While the method has been described with reference to 3D medical imaging, it is more generally applicable to imaging of 2D, 3D and indeed 4D or higher dimensionality data sets obtained from a wide variety of image capture devices and a wide variety of objects.

For example, the method may be applied to a variety of imaging types used in the medical field, referred to as modalities. In particular, the methods described herein may be applied to 3D image data sets collected by computer-assisted tomography (CT) scanners, magnetic resonance (MR) scanners, ultrasound scanners and positron-emission-tomography (PET) systems.

These 3D data sets are sometimes referred to as volume data. In medical imaging, 3D image data sets are generally large. Sizes of between 0.5 Gigabytes and 8 Gigabytes are not uncommon. For example, a medical image data set might comprise 1024×1024×1024 16-bit voxels which corresponds to approximately 2 Gigabytes of data. From this an image comprising 1024×1024 16-bit pixels might be rendered.

The methods described herein may also be applied to 2D image data sets, such as those collected by more conventional 2D X-ray machines, and 2D ultrasound scanners.

The methods and associated computer programs described herein may be applied to a variety of targets. In the medical field, the target may be a wide variety of anatomies and organs. For example, the methods may be applied to segment the kidney, in particular the renal cortex; the heart, in particular multi-chamber cardiac segmentation; the brain; the liver and the pancreas. Different similarity measures may perform best depending on the target, e.g. organ, being imaged.

More generally, the method is expected to perform well in any scenario and any type of image data in which the sample population (or non-medical equivalent) falls into multiple discrete sub-classes.

In summary the method described above uses a multi-atlas approach in which the atlases that form the multi-atlas data set are selected on the basis of image similarity measures, such as mutual information and cross-correlation, but not used directly, but rather as in intermediate result for computing a predicted segmentation accuracy. Predicted segmentation accuracy is a measure that is comparable across an entire set of possible segmentations. The image similarity measures are therefore not used directly to compare segmentations, but are used to predict the accuracy of the segmentation. This predicted accuracy is directly comparable across the set of segmentations. The method described in the above embodiments is based on a linear regression predictor model, which makes use of training data. By applying this method to whole heart segmentation in CT and using the correlation coefficient within a region of interest around the boundary of the heart as a predictor, it was observed that a set of four atlases, covering the different categories available in the training set, was able to produce a higher segmentation accuracy than using any single atlas.

While certain embodiments have been described, these embodiments have been presented by way of example only, and are not intended to limit the scope of the inventions. Indeed, the novel methods, computers and computer program products described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of selecting a plurality of M atlases from among a larger group of N candidate atlases to form a multi-atlas data set to be used for computer automated segmentation of novel image data sets to mark objects of interest therein, the method comprising:

(a) providing a computer with a set of candidate atlases, each candidate atlas containing a reference image data set and segmentation data which marks an object of interest within the reference image data set;

(b) providing the computer with a plurality of training image data sets, each containing a training image data set and segmentation data which marks an object of interest within the training image data set;

(c) segmenting in the computer each of the training image data sets against each of the candidate atlases such that for each candidate atlas in turn the following is carried out:

(i) registering the candidate atlas with each of the training image data sets;

(ii) segmenting each of the training image data sets with the candidate atlas;

(iii) computing an overlap between each training image data set and the candidate atlas;

(iv) computing a value of the similarity measure for each of the registrations;

(v) obtaining a set of regression parameters by performing a regression with the similarity measure being the independent variable and the overlap being the dependent variable;

(d) selecting in the computer a subset of M atlases from among all the N candidate atlases to form the multi-atlas data set, the M atlases being those atlases determined to collectively provide the highest aggregate overlap over all the training data image sets.

2. The method of claim 1 followed by:

(e) outputting the multi-atlas data set to a computer program product operable to segment novel image data sets.

3. The method of claim 1, wherein the reference image data sets and the training image data sets are one and the same image data sets, with the method being carried out using a leave-one-out strategy.

4. A computer program product stored on a non-transitory computer readable medium, bearing machine readable instructions for carrying out the method of claim 1.

5. A computer loaded with and operable to execute machine readable instructions for carrying out the method of claim 1.

* * * * *